US010990250B2

(12) United States Patent
Pendergast et al.

(10) Patent No.: US 10,990,250 B2
(45) Date of Patent: Apr. 27, 2021

(54) ORGANIZED TIMELINE

(71) Applicant: Apple Inc., Cupertino, CA (US)

(72) Inventors: Colleen Pendergast, Pleasanton, CA (US); Brian E. Meaney, Parkland, FL (US); David E. Conry, El Granada, CA (US); David N. Chen, Cupertino, CA (US); Itrat U. Khan, San Jose, CA (US); Jack S. Yi, San Francisco, CA (US); Jacqueline Chang, San Francisco, CA (US); Jeffery Morse, San Jose, CA (US); Jordan P. McCommons, San Jose, CA (US); Joshua C. Hoover, Brisbane, CA (US); Ken Matsuda, Sunnyvale, CA (US); Nils Angquist, Los Altos Hills, CA (US); Stephen A. Bayes, San Francisco, CA (US); William J. Feth, San Jose, CA (US); Michael Fleischhauer, Morgan Hill, CA (US); Peter A. Steinauer, San Francisco, CA (US); Zachary Kramer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/446,169

(22) Filed: Jun. 19, 2019

(65) Prior Publication Data
US 2019/0302977 A1 Oct. 3, 2019

Related U.S. Application Data

(63) Continuation of application No. 15/275,285, filed on Sep. 23, 2016, now Pat. No. 10,372,306.

(Continued)

(51) Int. Cl.
G06F 3/0484 (2013.01)
G11B 27/031 (2006.01)
G11B 27/34 (2006.01)

(52) U.S. Cl.
CPC ............ *G06F 3/0484* (2013.01); *G11B 27/34* (2013.01); *G09G 2354/00* (2013.01); *G11B 27/031* (2013.01)

(58) Field of Classification Search
CPC ..... G06F 3/0484; G11B 27/34; G11B 27/031; G09G 2354/00
See application file for complete search history.

(56) References Cited

U.S. PATENT DOCUMENTS 5,682,529 A * 10/1997 Hendry ...................... G06F 3/14
710/16
6,859,219 B1 * 2/2005 Sall ........................ G06F 1/1607
345/1.1

(Continued)

OTHER PUBLICATIONS

"Adobe Premiere Pro CS6 Classroom in a Book," Jul. 9, 2012, Adobe Press, (Year: 2012).

*Primary Examiner* — Andrew T Chiusano
(74) *Attorney, Agent, or Firm* — Invoke

(57) ABSTRACT

Some embodiments of the invention provide a GUI for a media editing application that provides visual cues (e.g., colors and/or lane sets) for media clips that are assigned different tags (or roles) in a media presentation. The GUI of the media application of some embodiments displays media clips of a composite media presentation, in which at least some of the media clips are associated with tags. The GUI also provides GUI controls for associating media clips associated with different tags with different colors and for displaying the media clips based on the clips' associated color. In some embodiments, the GUI includes a tool for arranging clips into groups based on assigned tags. The tool (Continued)

of some embodiments, upon selection, defines a set of lanes for each tag and displays any anchored clip that is associated with a tag in the set of lanes associated with the tag.

20 Claims, 18 Drawing Sheets

Related U.S. Application Data

(60) Provisional application No. 62/323,680, filed on Apr. 16, 2016.

(56) References Cited

U.S. PATENT DOCUMENTS

| | | | |
|---|---|---|---|
| 6,928,543 B2* | 8/2005 | Hendry | G06F 3/14 |
| | | | 345/1.1 |
| 7,805,678 B1 | 9/2010 | Niles et al. | |
| 7,873,916 B1 | 1/2011 | Chaudhri | |
| 2006/0132473 A1* | 6/2006 | Fuller | G06F 3/1438 |
| | | | 345/204 |
| 2006/0253797 A1* | 11/2006 | Madan | G06F 3/0483 |
| | | | 715/792 |
| 2007/0204216 A1 | 8/2007 | Morgan | |
| 2008/0165153 A1 | 7/2008 | Platzer et al. | |
| 2010/0281377 A1 | 11/2010 | Meaney et al. | |
| 2010/0281379 A1 | 11/2010 | Meaney et al. | |
| 2010/0281383 A1 | 11/2010 | Meaney et al. | |
| 2012/0017152 A1 | 1/2012 | Matsuda et al. | |
| 2012/0079382 A1 | 3/2012 | Swenson et al. | |
| 2012/0210218 A1 | 8/2012 | Pendergast et al. | |
| 2012/0210220 A1 | 8/2012 | Pendergast et al. | |
| 2012/0210221 A1* | 8/2012 | Khan | G11B 27/034 |
| | | | 715/716 |
| 2012/0210230 A1 | 8/2012 | Matsuda et al. | |
| 2012/0254788 A1* | 10/2012 | Nicholson | G06F 3/0481 |
| | | | 715/778 |
| 2013/0073959 A1 | 3/2013 | Eppolito et al. | |
| 2013/0073962 A1 | 3/2013 | Pendergast et al. | |
| 2013/0125000 A1 | 5/2013 | Fleischhauer et al. | |
| 2013/0132885 A1* | 5/2013 | Maynard | G06F 3/04883 |
| | | | 715/777 |
| 2013/0263003 A1 | 10/2013 | Joseph et al. | |
| 2014/0006978 A1 | 1/2014 | Meehan | |
| 2014/0304643 A1* | 10/2014 | Holland | G06F 9/451 |
| | | | 715/781 |
| 2014/0359505 A1 | 12/2014 | Cisler et al. | |
| 2014/0380201 A1* | 12/2014 | Massand | G06F 3/1423 |
| | | | 715/761 |
| 2015/0186016 A1* | 7/2015 | Li | G06F 3/0488 |
| | | | 715/765 |
| 2015/0268915 A1* | 9/2015 | Kizaki | G06F 3/1431 |
| | | | 345/1.3 |
| 2018/0046428 A1* | 2/2018 | Breedvelt-Schouten | |
| | | | G06F 3/1423 |
| 2019/0065007 A1* | 2/2019 | Butter | G06F 3/0486 |

\* cited by examiner

ORGANIZED TIMELINE

INCORPORATION BY REFERENCE; DISCLAIMER

Each of the following applications are hereby incorporated by reference: application Ser. No. 15/275,285 filed on Sep. 23, 2016; application No. 62/323,680 filed on Apr. 16, 2016. The Applicant hereby rescinds any disclaimer of claim scope in the parent application(s) or the prosecution history thereof and advises the USPTO that the claims in this application may be broader than any claim in the parent application(s).

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple, Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media editing applications facilitate such composition through a graphical user interface (GUI) whereby designers digitally manipulate graphical representations of the media content to produce a desired result. However, in many cases, the designers experience inconvenience in managing and organizing the various types and groups of graphical representations of the media content because of the shortcomings of the existing applications. Moreover, as media projects grow in size and complexity, it is increasingly difficult to manage and organize the various media content used in a media project.

BRIEF SUMMARY

Some embodiments of the invention provide a graphical user interface (GUI) for a media editing application that provides visual cues (e.g., colors) for media clips that are assigned different tags (or roles) in a media presentation. The GUI of the media application of some embodiments includes a composite display area (or timeline) for displaying media clips for compositing into a composite media presentation. At least some of the media clips are associated with tags. The GUI also provides a set of GUI controls for associating media clips associated with different tags with different colors and for displaying the media clips in the composite display area based on the clips' associated color.

The clips for the composite media presentation in some embodiments are selected from different libraries used to organize separate collections of content. In some such embodiments, the association of colors with the tags in each library is independent of associations made in other libraries. For example, a particular tag (e.g., dialogue) may be assigned a first color in a first library, but the same particular tag may be assigned a different color in a different second library.

The clips of some embodiments are audio media clips that are displayed in the composite display area with a waveform that represents the clip's audio content. The waveform of some embodiments is displayed with a first tone of the clip's associated color in front of a background that is displayed in a second tone of the clip's associated color. In some embodiments, when a volume level of the audio clip is lowered, a portion of the audio clip's waveform that is muted is displayed with a third tone of the associated color to indicate that the audio content will not be audible.

In some embodiments, the set of controls of the GUI includes controls that define how clips are to be vertically positioned with respect to each other in the composite display area based on the assigned tags. In some embodiments, the controls include selectable tag controls that are moveable with respect to each other in order to modify a vertical arrangement of overlapping tag-associated clips in the composite display area. The subset of controls of some embodiments is an ordered list of selectable tags and the vertical positioning of the media clips depends on a tag order defined in the ordered list.

The clips of some embodiments include multiple subcomponents (e.g., video, multiple audio channels, etc.). In some embodiments, different subcomponents of a particular clip can be assigned different sets of tags. In some embodiments, the GUI provides visual indications to allow a user to identify the several related subcomponents of a particular clip. For example, in some embodiments, when a particular subcomponent of a clip is selected, a region that includes all of the subcomponents of the clip is highlighted in the composite display area. In some embodiments, a selected subcomponent is identified (e.g., using a border) with a first color, while the remaining subcomponent of the clip are identified using a different second color.

In some embodiments, some modifications (e.g., trimming, extensions, etc.) to a subcomponent clip of a clip affect other subcomponents of the clip. The modification tools of some embodiments allow modifications for the subcomponent clips to be applied separately, breaking the alignment of the subcomponent clips. In some embodiments, when the modification affects an aligned subcomponent clip that is not displayed in the display area, the GUI provides an off-screen indicator to indicate that modifications to a subcomponent will affect another subcomponent of the clip that is not displayed in the display area.

In addition to the composite display area, the GUI of some embodiments includes an inspector for displaying information about a selected clip. The inspector of some embodiments displays all of the subcomponents for a selected clip and allows a user to modify tags individually for each of the subcomponent clips. In some embodiments, effects are applied separately for each role-subcomponent group.

The GUI of some embodiments includes a focusing tool for focusing on clips associated with a particular tag in the composite display area. In some embodiments, the representations for the media clips in the timeline show content (e.g., thumbnails, audio waveforms, text, etc.) related to the media clip. Using the focus tool, representations for the media clips not associated with the particular tag do not display the associated content, but rather are displayed as a single solid line in the colors of their associated tags. The GUI only displays the associated content for the media clips with the focused tag.

In some embodiments, the GUI includes a second-monitor user interface (UI) item for displaying different elements of the GUI (e.g., browser, timeline, inspector, etc.) on a second monitor. The second-monitor UI item of some embodiments is only displayed when the media editing application detects a second monitor.

In some embodiments, the tags are arranged in a hierarchy, with parent tags and sub-tags nested within a parent tag. In some such embodiments, media clips associated with the parent tag are displayed in an associated color and media clips associated with the sub-tags are displayed with alternating shades of the associated color.

Some embodiments of the invention provide a GUI for a media editing application that provides a tool for arranging clips assigned with different tags in a way to distinguish clips assigned with the different tags. In some embodiments, the GUI includes a composite display area for arranging clips along a timeline to define a composite presentation. The composite display area includes a central compositing lane (or spine) that spans the timeline to arrange a first set of clips and to anchor a second set of clips to the first set of clips. The clips are associated with different tags. The GUI also includes a GUI control that upon selection, defines a set of lanes for each tag and displays any anchored clip that is associated with a tag in the set of lanes associated with the tag.

In some embodiments, the GUI control is a toggle control that changes a display mode in the composite display area between a standard view and a tag-based lane view. The standard view displays anchored clips so that each clip is displayed as near to the spine as possible, without overlapping other clips. In such a manner, clips associated with two different tags can occupy the same vertical position (i.e., can share a same lane) in the composite display area.

In the tag-based lane view, the clips are divided into lanes based on the associated tags, so that no two anchored clips, associated with two different tags, can occupy the same vertical position in the composite display area. The GUI of some embodiments vertically positions the tagged anchor clips according to an ordered list of tags that can be modified within the GUI. When a first tag is in a higher position than a second tag in the ordered list, the set of lanes for the first tag is closer to the spine than the set of lanes for the second tag.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
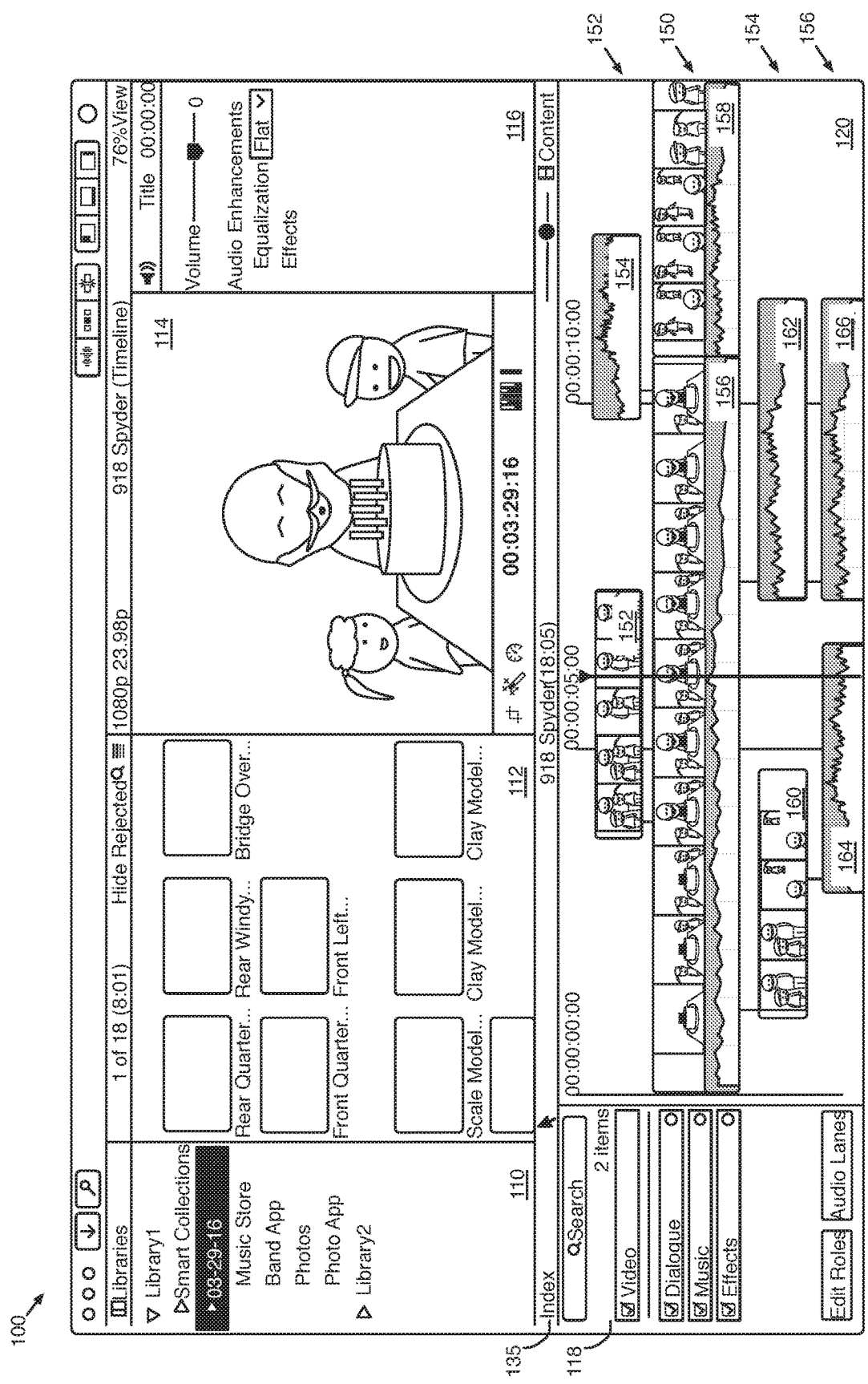
FIG. 1 illustrates an example of a graphical user interface (GUI) for a media editing application with an organized timeline.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a graphical user interface (GUI) for a media editing application that provides visual cues (e.g., colors) for media clips that are assigned different tags (or roles) in a media presentation. The GUI of the media application of some embodiments includes a composite display area (or timeline) for displaying media clips for compositing into a composite media presentation. At least some of the media clips are associated with tags. The GUI also provides a set of GUI controls for associating media clips associated with different tags with different colors and for displaying the media clips in the composite display area based on the clips' associated color.

The clips for the composite media presentation in some embodiments are selected from different libraries used to organize separate collections of content. In some such embodiments, the association of colors with the tags in each library is independent of associations made in other libraries. For example, a particular tag (e.g., dialogue) may be assigned a first color in a first library, but the same particular tag may be assigned a different color in a different second library.

The clips of some embodiments are audio media clips that are displayed in the composite display area with a waveform that represents the clip's audio content. The waveform of some embodiments is displayed with a first tone of the clip's associated color in front of a background that is displayed in a second tone of the clip's associated color. In some embodiments, when a volume level of the audio clip is lowered, a portion of the audio clip's waveform that is muted is displayed with a third tone of the associated color to indicate that the audio content will not be audible.

In some embodiments, the set of controls of the GUI includes controls that define how clips are to be vertically positioned with respect to each other in the composite display area based on the assigned tags. In some embodiments, the controls include selectable tag controls that are moveable with respect to each other in order to modify a vertical arrangement of overlapping tag-associated clips in the composite display area. The subset of controls of some embodiments is an ordered list of selectable tags and the vertical positioning of the media clips depends on a tag order defined in the ordered list.

The clips of some embodiments include multiple subcomponents (e.g., video, multiple audio channels, etc.). In some embodiments, different subcomponents of a particular clip can be assigned different sets of tags. In some embodiments, the GUI provides visual indications to allow a user to identify the several related subcomponents of a particular clip. For example, in some embodiments, when a particular subcomponent of a clip is selected, a region that includes all of the subcomponents of the clip is highlighted in the composite display area. In some embodiments, a selected subcomponent is identified (e.g., using a border) with a first color, while the remaining subcomponent of the clip are identified using a different second color.

In some embodiments, some modifications (e.g., trimming, extensions, etc.) to a subcomponent clip of a clip affect other subcomponents of the clip. The modification tools of some embodiments allow modifications for the subcomponent clips to be applied separately, breaking the alignment of the subcomponent clips. In some embodiments, when the modification affects an aligned subcomponent clip that is not displayed in the display area, the GUI provides an off-screen indicator to indicate that modifications to a subcomponent will affect another subcomponent of the clip that is not displayed in the display area.

In addition to the composite display area, the GUI of some embodiments includes an inspector for displaying information about a selected clip. The inspector of some embodiments displays all of the subcomponents for a selected clip and allows a user to modify tags individually for each of the subcomponent clips. In some embodiments, effects are applied separately for each role-subcomponent group.

The GUI of some embodiments includes a focusing tool for focusing on clips associated with a particular tag in the composite display area. In some embodiments, the representations for the media clips in the timeline show content (e.g., thumbnails, audio waveforms, text, etc.) related to the media clip. Using the focus tool, representations for the media clips not associated with the particular tag do not display the associated content, but rather are displayed as a single solid line in the colors of their associated tags. The GUI only displays the associated content for the media clips with the focused tag.

In some embodiments, the GUI includes a second-monitor user interface (UI) item for displaying different elements of the GUI (e.g., browser, timeline, inspector, etc.) on a second monitor. The second-monitor UI item of some embodiments is only displayed when the media editing application detects a second monitor.

In some embodiments, the tags are arranged in a hierarchy, with parent tags and sub-tags nested within a parent tag. In some such embodiments, media clips associated with the parent tag are displayed in an associated color and media clips associated with the sub-tags are displayed with alternating shades of the associated color.

Some embodiments of the invention provide a GUI for a media editing application that provides a tool for arranging clips assigned with different tags in a way to distinguish clips assigned with the different tags. In some embodiments, the GUI includes a composite display area for arranging clips along a timeline to define a composite presentation. The composite display area includes a central compositing lane (or spine) that spans the timeline to arrange a first set of clips and to anchor a second set of clips to the first set of clips. The clips are associated with different tags. The GUI also includes a GUI control that upon selection, defines a set of lanes for each tag and displays any anchored clip that is associated with a tag in the set of lanes associated with the tag.

In some embodiments, the GUI control is a toggle control that changes a display mode in the composite display area between a standard view and a tag-based lane view. The standard view displays anchored clips so that each clip is displayed as near to the spine as possible, without overlapping other clips. In such a manner, clips associated with two different tags can occupy the same vertical position (i.e., can share a same lane) in the composite display area.

In the tag-based lane view, the clips are divided into lanes based on the associated tags, so that no two anchored clips, associated with two different tags, can occupy the same vertical position in the composite display area. The GUI of some embodiments vertically positions the tagged anchor clips according to an ordered list of tags that can be modified within the GUI. When a first tag is in a higher position than a second tag in the ordered list, the set of lanes for the first tag is closer to the spine than the set of lanes for the second tag.

Many examples of an organized timeline are described below. Section I describes a graphical user interface (GUI) for a media editing application with an organized timeline. Section II then describes examples of organizing media clips within the organized timeline. Section III describes examples of tools for working with the organized timeline. Finally, Section IV describes several example electronic systems that implement some embodiments described herein.

I. GUI with an Organized Timeline

FIG. 1 illustrates an example of a graphical user interface (GUI) for a media editing application with an organized timeline. The GUI 100 includes a clip library 110, a clip browser 112, a preview display area 114, an inspector 116, a timeline index 118, and a timeline 120.

The clip library 110 displays libraries and the associated folders (or events) and clips includes a set of folders through which a user accesses media clips that have been imported into the media editing application. In some embodiments, a library is a collection of folders (or events), media (e.g., video and audio clips), and projects. Projects define a composite media presentation with media clips and effects for the clips along a timeline. A single library may include multiple projects, folders, and/or media.

Some embodiments organize the media clips in the clip library 110 according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). In some embodiments, the media files corresponding to these clips are stored in a file storage structure that mirrors the folders shown in the clip library.

As shown, the clip library 110 includes multiple libraries (i.e., Library1 and Library2). Each library can include several folders or collections of media that are separated based on various levels of organization (e.g., different sources, media types, subject matter, recording dates, etc.). In this example, Library1 includes a folder for content captured on Mar. 29, 2016 (i.e., "03-29-16"), a music store for music, a photos folder for photos, and folders for other applications with media content.

Within the clip library 110, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on keywords assigned to the media clips. For instance, in the "03-29-16" event, all media clips showing children might be tagged with a "kids" keyword, and then these particular media clips could be displayed in a sub-folder of the sub-folder that filters clips to only display media clips tagged with the "kids" keyword.

When a collection (e.g., a folder) is selected in the clip library 110, the clip browser 112 displays media clips from the selected folder. As shown in this example, the folder "03-29-16" is selected in the clip library 110, and representations of the media clips belonging to that folder are displayed in the clip browser 112. In some embodiments, the representations display visualizations of the content of the media clips. For example, in some embodiments video clips are displayed as thumbnail filmstrips and audio clips are displayed with an audio waveform representing the audio of the audio clip. In some embodiments, some of the media clips include both audio and video and are displayed with a combination of both a thumbnail filmstrip and an audio waveform. In some embodiments, similar representations are displayed for the media clips in the timeline 120.

The preview display area 114 (also referred to as a "viewer") displays images from media files that the user is skimming through, playing back, or editing. These images may be from a composite presentation in the timeline 120 or from a media clip in the clip browser 112. In this example, the user has been skimming through the beginning of clip 140, and therefore an image from the start of this media file is displayed in the preview display area 114. As shown, some embodiments will display the images as large as possible within the display area while maintaining the aspect ratio of the image.

The inspector 116 displays detailed properties about a selected item and allows a user to modify some or all of these properties. The selected item might be a clip, a composite presentation, an effect, etc. In this case, the clip that is shown in the preview display area 114 is also selected, and thus the inspector displays information about media clip 140. This information includes duration, file format, file location, frame rate, date created, audio information, etc. about the selected media clip. In some embodiments, different information is displayed depending on the type of item selected. The inspector 116 of some embodiments is also used to modify properties (e.g., roles, effects, etc.) of the selected media clips.

The timeline index 118 provides tools for organizing and rearranging media clips within the timeline 120 based on roles assigned to the various media clips. The timeline index 118 of some embodiments includes a set of selectable role UI items that define a role index order that determines priorities for the different roles assigned to media clips in the composite presentation. The media clips are displayed in the timeline according to the role index order. The selectable role UI items of some embodiments can be rearranged to rearrange the media clips in the timeline 120.

The timeline 120 provides a visual representation of a composite presentation (or project) being created by the user of the media editing application. Specifically, it displays one or more geometric shapes that represent one or more media clips that are part of the composite presentation. The position and size of the representation within the timeline 120 determines the effect (e.g., duration, priority, etc.) of the media clip within the composite presentation.

The timeline 120 of some embodiments includes a primary lane (also called a "spine", "primary compositing lane", or "central compositing lane") as well as one or more secondary lanes (also called "anchor lanes") above and/or below the primary lane. The spine represents a primary sequence of media which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

Clips placed in the anchor lanes are referred to as "anchored clips." This figure shows a media clip 175 that is anchored off of another media clip 180 in the timeline 120. In some of these embodiments, media clips can be placed in these anchor lanes to anchor off of media clips in the central compositing lane 150. Instead of, or in conjunction with, having several levels of media clips that anchor off the central compositing lane 150, some embodiments allow media clips to be placed in these anchor lanes and to be anchored off of other anchored media clips placed in these anchor lanes. To help the user distinguish the central compositing lane 150 and the anchored lanes in the timeline 120, some embodiments use different tones for these lanes. For instance, the timeline 120 uses a darker tone for the central compositing lane 150 than the tone for the anchored lanes 155, 160, and 165.

As shown, the timeline 120 can place different types (e.g., audio clip, video clip, audio and video clip, etc.) of media clips in the same lane (a central compositing lane or an anchored lane). Also, the timeline 120 can place different types of media clips in the anchor lanes above and below the central compositing lane. In other words, the timeline 120 can place a media clip of any type in any lane of the timeline 120.

Also, when there are multiple anchored clips at a particular horizontal position along the timeline 120, the media content of an anchored clip in an upper anchor lane takes the priority over the media content of a media clip in a lower lane in some embodiments. For instance, the video content of the media clip in the uppermost anchor lane will be the content of the presentation for the period time along the timeline that the media clip spans. In some embodiments, priority of the clips is determined based on the assigned roles and can be modified using different controls (e.g., the role index order of timeline index 118).

One of ordinary skill will also recognize that the set of display areas shown in the GUI 100 is one of many possible configurations for the GUI of some embodiments. For instance, in some embodiments, the presence or absence of many of the display areas can be toggled through the GUI (e.g., the inspector 116, browser 112, timeline 120, etc.). In addition, some embodiments allow the user to modify the size of the various display areas within the UI. For instance, when the timeline 120 is removed, the inspector 116 can increase in size to include that area.

In addition to the various display areas, the GUI of some embodiments includes controls for creating the composite presentation. The controls of some embodiments include items for various media editing functions including various video effects, visual transitions, applying a retiming operation to a portion of the timeline, adjusting color, trimming, anchoring, creating position clips, etc. In this example, controls for each of the display areas are distributed amongst the display areas based on the related function of the controls. For example, controls for managing playback in the preview display area 114 are located within the preview display area 114. In some embodiments, the controls are located in a separate toolbar that is always displayed so that the controls are not hidden or moved when the display areas in the GUI are modified.

Figure 2:
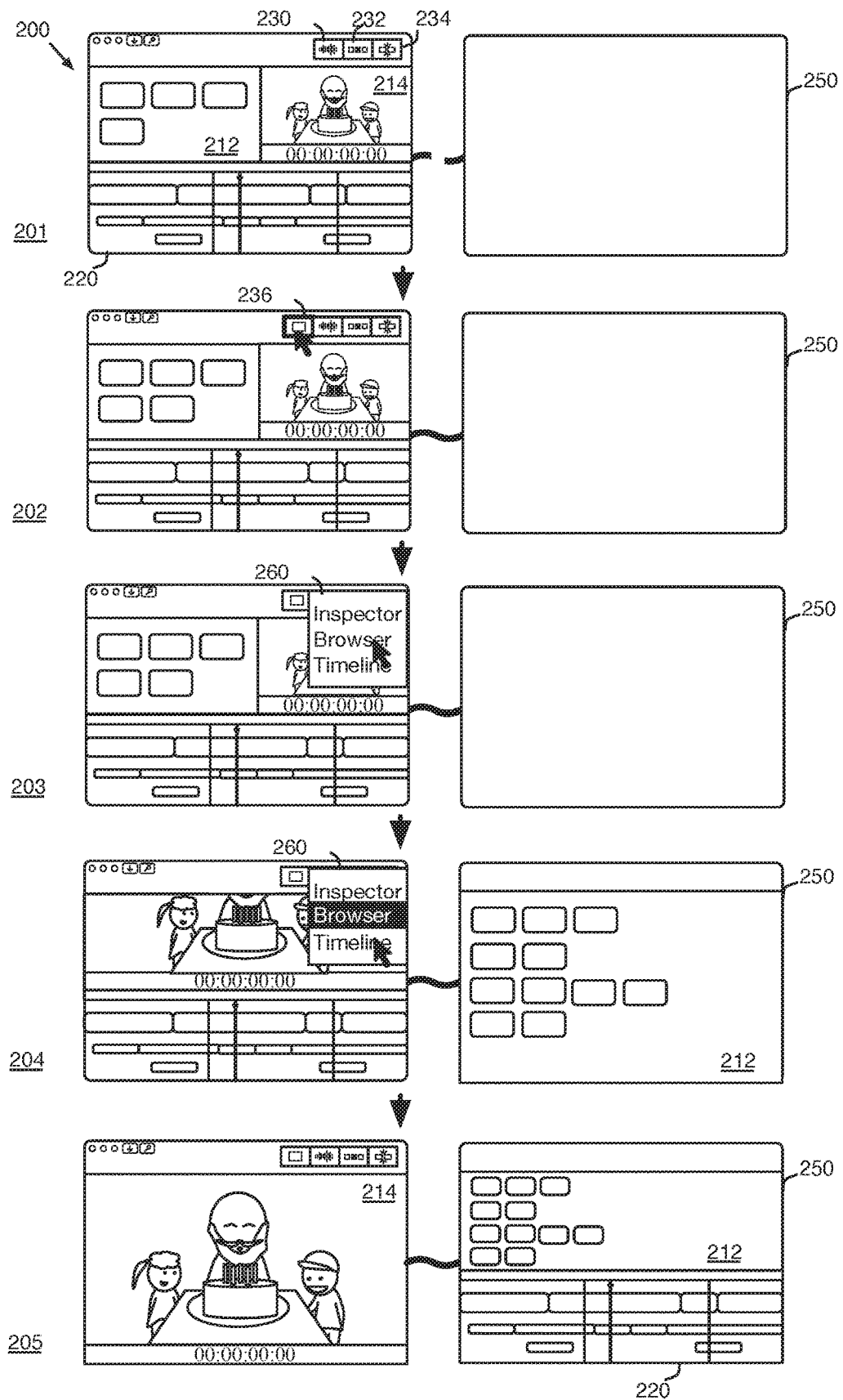
FIG. 2 illustrates an example of a dynamic second-screen tool for organizing a media editing application.

The GUI of some embodiments includes dynamic controls for customizing the layout of the GUI. FIG. 2 illustrates an example of a dynamic second-screen UI item for organizing a media editing application in five stages 201-205. The first stage 201 shows GUI 200, similar to GUI 100 as described above with reference to FIG. 1. GUI 200 includes three display area UI items 230, 232, and 234 for displaying the browser 212, timeline 220, and preview display area 214, respectively. Each of the display areas (e.g., browser, timeline inspector, etc.) can be shown or hidden using the display area UI items 230, 232, and 234 respectively, according to a user's preferences. The display area UI items 230, 232, and 234 allow a user to hide display areas that are unnecessary or to make room to enlarge other display areas in the GUI. The first stage 201 also shows that a second monitor 250 is not connected.

The second stage 202 shows that the media editing application has detected a new monitor 250 (e.g., a new monitor has been connected or configured). In response, the GUI 200 displays a new display area icon 236. In some embodiments, the new display area icon 236 is only displayed when a second monitor is detected. In other embodiments, the new display area icon 236 is always displayed, but is inactive (e.g., unselectable) until a new monitor is detected.

In the second stage 202, the user selects the new display area icon 236. In some embodiments, the new display area icon 236 is a two-part user interface (UI) control that (1) extends the GUI to the second monitor and (2) allows a user move any of the available display areas to the second monitor. In some embodiments, the GUI 200 automatically extends to the second monitor 250 when the second monitor is detected, while in other embodiments, the GUI 200 is only extended to the second monitor when a display area is sent to the second monitor 250 using the new display area icon 236.

The third stage 203 shows that, in response to the selection of the new display area icon 236, the GUI 200 displays a menu 260 that lists the different display areas (i.e., Inspector, Browser, Timeline) of the GUI 200. The user selects the browser from the menu 260 to move the browser from the GUI 200 to the display on the second monitor 250.

The fourth stage 204 shows that the display area for the browser 212 has been moved from the GUI 200 to the new monitor 250. The browser 212 is expanded on the second monitor 250, allowing a user to view more of the browser content. The browser 212 is also removed from the GUI 200 of the first monitor, freeing up space and allowing the preview window 214 to expand horizontally to a full-screen width.

In some embodiments, the menu 260 distinguishes display areas that are displayed on the second monitor 250 by highlighting them or providing other visual cues (e.g., checkmarks, etc.) to indicate that they are being displayed on the second monitor 250. The fourth stage 204 also shows that the user selects Timeline from the menu 260 to move the timeline 220 from the first monitor to the second monitor 250.

Finally, in the fifth stage 205, timeline 220 is moved to the second monitor 250, separate from the preview window and inspector. The browser 212 is resized to fit with the timeline 220 and the GUI 200 on the first monitor is now entirely dedicated to the preview window 214. In some embodiments, the timeline 220 is an organized timeline that allows a user to quickly organize and rearrange media clips of a composite presentation to facilitate editing the composite presentation. The organized timeline will be described in further detail in the sections below.

II. Organizing Media Clips in an Organized Timeline

Figure 3A:
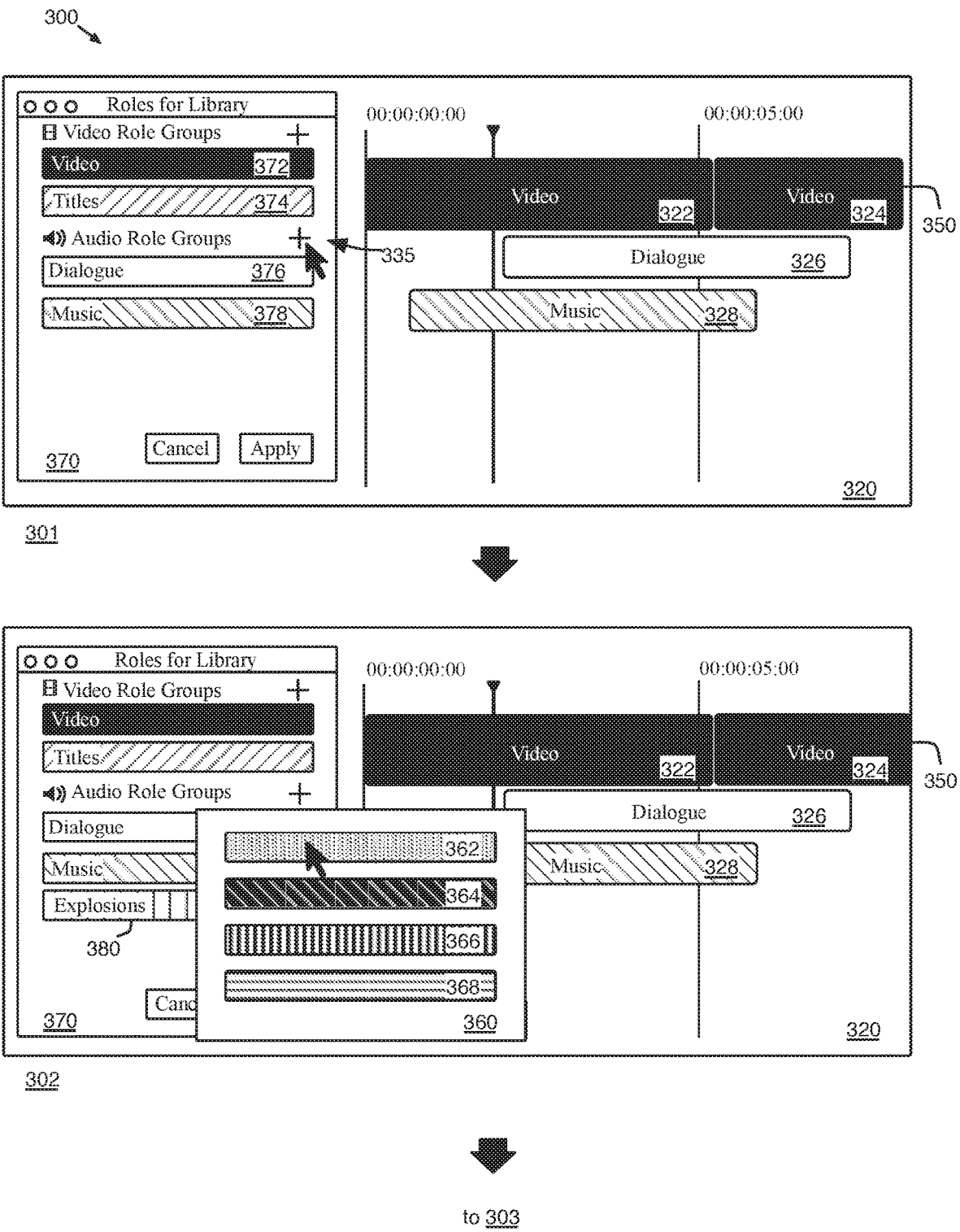
FIGS. 3A-C illustrate an example of assigning roles and sub-roles to media clips of a composite presentation.
Figure 3B:
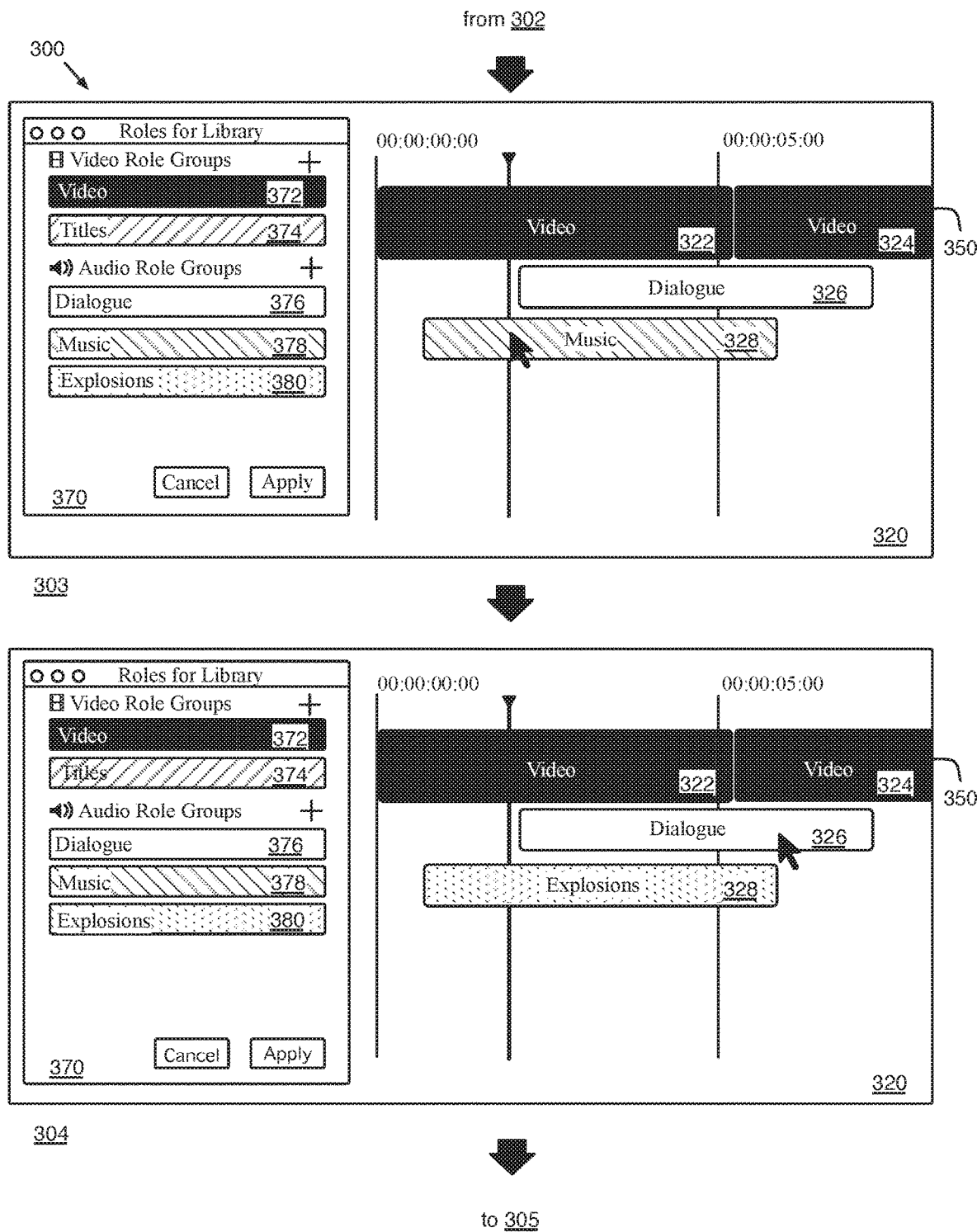
Figure 3C:
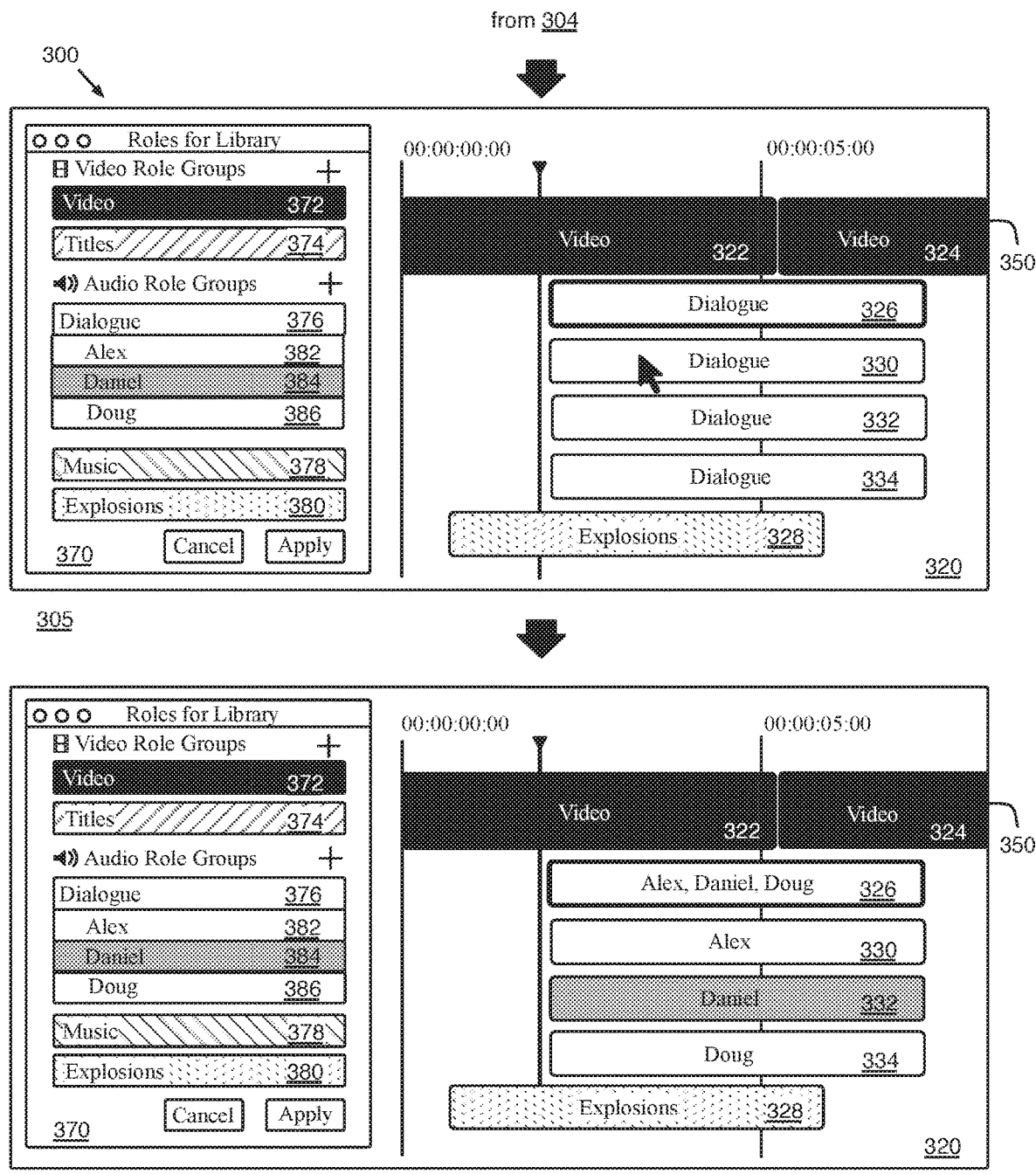

FIGS. 3A-C illustrate an example of assigning roles and sub-roles to media clips of a composite presentation in six stages 301-306. The first stage 301 shows a GUI 300 with a timeline 320 and a role editor 370. In some embodiments, the role editor 370 is a UI element for adding and removing roles and assigning different properties (e.g., colors) to the different roles. In some embodiments, roles are assigned different colors to allow for efficient visual distinctions between media clips of the different roles. In this example, the different colors are represented with different patterns (e.g., solid, ascending/descending diagonals, etc.). For readability and simplicity in the drawings, each media clip in the timeline of this example is shown as a simple block, but it should be understood that the media clip representations of some embodiments will display content (e.g., audio waveforms, video thumbnails, etc.) related to the media clip.

The role editor 370 of some embodiments is a part of a timeline index for managing the display of roles in the timeline 320. The role editor 370 shows video roles 372 and 374 ("Video" and "Titles"), which are assigned to video media clips (or to video portions of an audio/video media clip), and audio roles 376 and 378 ("Dialogue" and "Music"), which are assigned to audio media clips (or to audio portions of an audio/video media clip) of the composite presentation. The roles of some embodiments are used to classify media content based on a function or content type (e.g., dialogue, video, title, music, effects, etc.) of the media clip within the composite presentation.

The GUI 300 of some embodiments displays the clips based on the roles (e.g., with different colors or with separated lane sets) to facilitate editing of groups of clips with similar content and/or functionality (e.g., dialogue, effects, etc.) in the presentation. For example, in some embodiments, each media clip is displayed in a timeline with a color based on a role associated with the media clip. The color may be displayed as a border around the representation of the media clip or different tones of the color may be used in displaying content for the media clip, as described below with reference to FIG. 5.

As described above, libraries of some embodiments serve as a container for media, events (i.e., folders), and projects associated with the library. In some embodiments, the color assigned to each role (e.g., dialogue, video, title, etc.) is separately identified for each library. For example, a dialogue tag in a first library may be assigned a color purple, while the same dialogue tag in a second different library may be assigned a color red.

Timeline 320 is for arranging media clips for a composite presentation. In this example, timeline 320 displays media clips (or representations of the media clips) 322-328. Media clips 322 and 324 are assigned the video role, media clip 326 is assigned a dialogue role, and media clip 328 is assigned a music role. In this example, each clip is shown with text that identifies the assigned role. In some embodiments, GUI 300 is configurable to display different information about a media clip (e.g., assigned role, source file name, etc.) in the timeline 320.

In some embodiments, the media editing application automatically assigns roles to the media clips during import. In some embodiments, the roles can also be manually assigned by a user, or as a combination of custom user-assigned roles and automatic application-assigned roles. The automatically assigned roles of some embodiments are assigned based on metadata (e.g., iXML, camera data, storage media data, etc.) associated with the media clips during import. The metadata of some embodiments is assigned by other programs or by recording devices (e.g., cameras, microphones, etc.) used to record the media clips. In some such embodiments, the automatically assigned roles can also be overridden during import, allowing a user to manually assign certain roles to media clips during import, without regard to the associated metadata.

In the first stage 301, the role editor 370 displays roles 372-378 assigned to media clips in the composite presentation. The first stage 301 shows that the user selects UI item 335 to add a new audio role. The second stage 302 shows that a new audio role 380 ("Explosions") has been added to the role editor 370. The new role 380 can be used to create additional groups of media clips in the composite presentation that should be processed together (e.g., apply a set of audio effects, output to a common track, re-order within the timeline, etc.). The new role 380 has been assigned a default color (indicated by vertical lines).

In some embodiments, the colors for the different roles, whether automatically assigned or manually created, can be customized by the user. The second stage 302 shows a color selector 360 for selecting a new color for the new role 380. Color selector 360 includes various different colors 362-368 (indicated in this example by different patterns). Although shown with a specified few colors in this example, the color selector 360 may include any of a number of different methods for selecting a color in an application (e.g., a color wheel, color selector, etc.). In the second stage 302, the user selects color 362 from the color selector 370 to assign the new color (indicated by a dotted pattern) to the new role 380.

The third stage 303 shows that the new color has been assigned to the new role 380. In addition, the user selects media clip 328 to assign the new role to the media clip. Roles for media clips can be assigned to the media clips in various ways (e.g., through context menus, keyboard shortcuts, application menus, etc.). In some embodiments, the roles can also be assigned through various controls in the other display areas (e.g., browser 112 and inspector 116 of FIG. 1). In the fourth stage 304, media clip 328 has been reassigned to the explosions role 380 and the color for the media clip 328 has changed to the dotted pattern to reflect the new role.

In some embodiments, media clips are made up of multiple subcomponents. For example, a media clip (or parent media clip) may include a video subcomponent and several audio subcomponents (e.g., audio channels, etc.). In some embodiments, each subcomponent is displayed as a separate media clip, while in other embodiments the subcomponents are not displayed separately from the parent media clip. In some embodiments, the subcomponents are only displayed in certain situations.

For example, in some embodiments, when a parent media clip, or one of the subcomponents, is selected, the inspector (such as inspector 116 described above with reference to FIG. 1) displays an expanded view of the selected item, displaying the selected item as well as the other subcomponents related to the selected item. The GUI of different embodiments provide a variety of different ways for the user to invoke a command to display different views (e.g., collapsed, expanded) of a media clip. In the example of FIG. 3, media clip 326 is made up of subcomponents (e.g., different audio channels). The fourth stage 304 also shows that the user selects media clip 326 to display the subcomponents in the timeline 320.

The fifth stage 305 shows that media clip 326 has been expanded to show subcomponents 330-334. Each of the subcomponents 330-334 is associated with the same dialogue role as the parent media clip 326. The fifth stage 305 also shows that new video sub-roles 382, 384, and 386 ("Alex," "Daniel," and "Douglas") have been added (e.g., using UI item 335) and nested beneath the parent audio role "Dialogue" in the role editor 370. Sub-roles can be added to automatically assigned roles or to user-created roles. Sub-roles allow a user to organize different sets of media clips within a particular role. In some embodiments, the different sub-roles are displayed in the same color as the parent role. In other embodiments, the different sub-roles are displayed in different shades of the parent role, or in alternating shades of the color of the parent role.

The sixth stage 306 shows that the subcomponents 330-334 have each been assigned a different sub-role, based on a speaker or voice associated with the subcomponent. In this example, the different clips 330-334 have been assigned new sub-roles "Alex," "Daniel," and "Douglas" respectively, to identify different speakers for the clips assigned to the different dialogue sub-roles. The parent clip 326 of some embodiments is a container for the subcomponents and is not assigned its own role, but rather displays the roles assigned to the subcomponents 330-334.

In addition, in some embodiments, all of the clips assigned to the different sub-roles are shown in the color of the parent role or with color schemes related to the color of the parent role. (e.g., the same color, different shades of the same color, etc.). In this example, the different sub-roles are shown in alternating shades of the parent role color.

Figure 4:
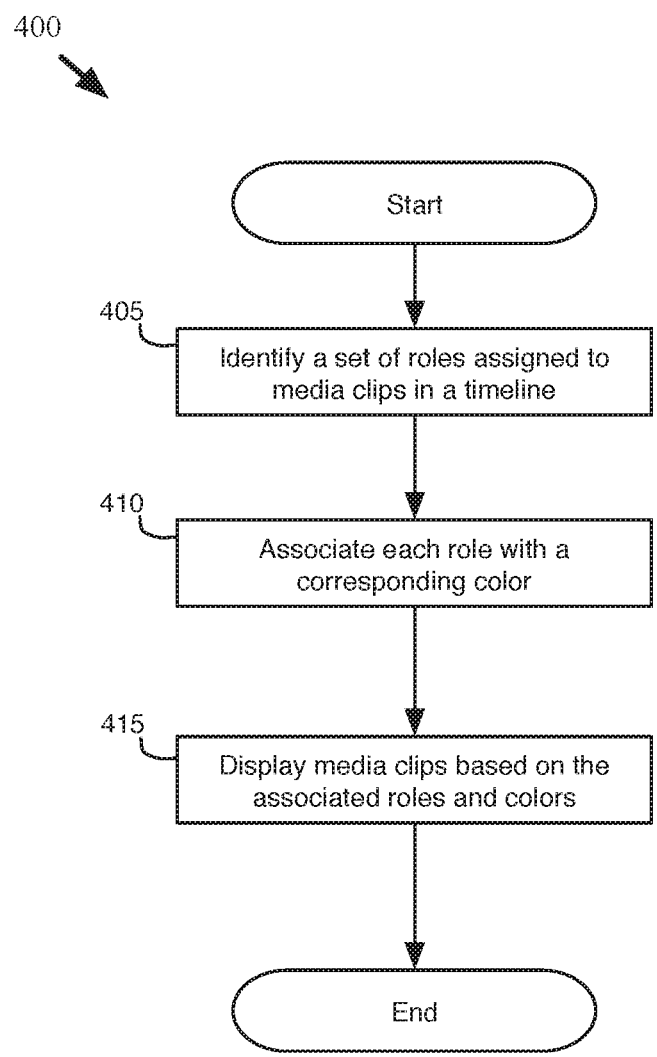
FIG. 4 conceptually illustrates a process for displaying media clips of a composite presentation based on associated roles.

FIG. 4 conceptually illustrates a process for displaying media clips of a composite presentation based on associated roles. The process 400 identifies (at 405) a set of roles assigned to media clips in a timeline of the composite presentation. The process 400 associates (at 410) each role with a corresponding color. In some embodiments, the roles are automatically associated with a color, but can be customized by a user. The process 400 then displays (at 415) the media clips in the composite display area based on the clips' associated color. In some embodiments, displaying the media clips based on the associated color includes displaying related content of the media clip using multiple tones of the associated color. The process 400 then ends.

Figure 5:
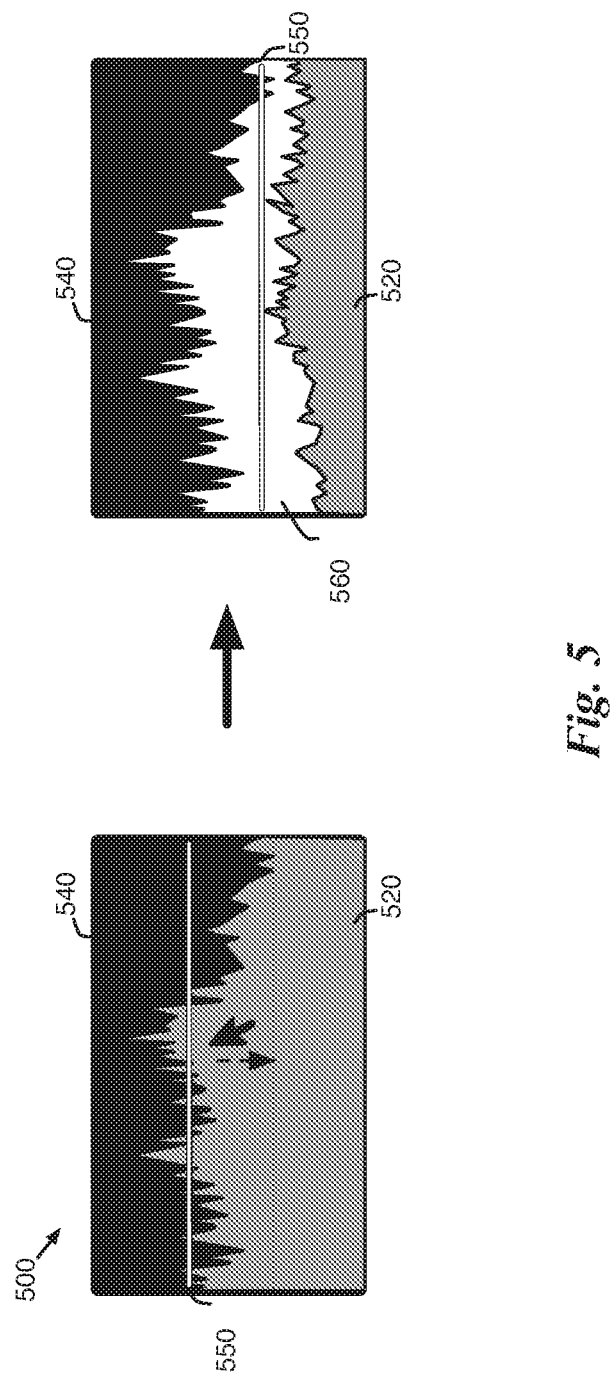
FIG. 5 illustrates an example of a multi-tone color schema for media clips associated with roles.

The role color is used in differentiating media clips that are associated with the different roles and sub-roles in a composite presentation. FIG. 5 illustrates an example of a multi-tone color schema for media clips associated with roles in four stages 501-504. The example of this figure shows a media clip 500, as it is displayed in the timeline and/or browser of some embodiments. As described above, in some embodiments, each tag is associated with a color and the media clips are displayed in the associated color.

The first stage 501 shows an audio clip 500 with a multi-tone color scheme. The media clip represents an audio clip and displays a waveform 520 as a visual representation of the audio content of the media clip. The representation of the audio clip displays a first shade (or tone) of a color associated with the tag for audio clip 500 for the background 540. The representation displays a second, different shade of the associated color for the waveform 520.

The first stage 501 also shows that audio clip 500 includes an audio level control 550 for modifying the audio levels of audio clip 500. In the first stage 501, the user selects the audio level control 550 to reduce the audio levels for audio clip 500.

In the second stage 502, the audio levels for media clip 500 have been reduced to a new lower level. Media clip 500 displays a portion 560 of the waveform with a third shade of the associated color to indicate that the portion 560 of the audio clip's waveform 520 is muted and that the audio content will not be audible.

Figure 6:
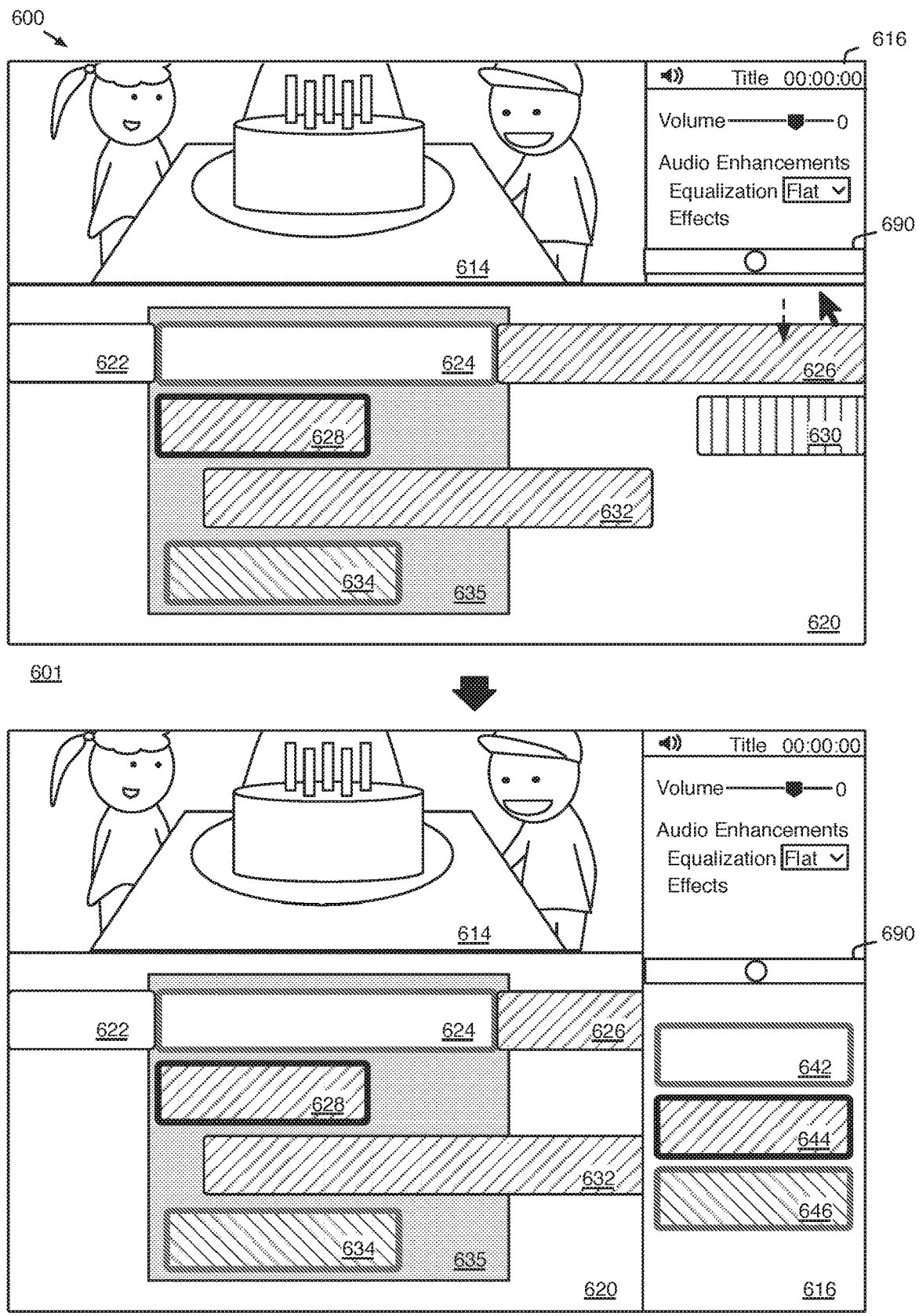
FIG. 6 illustrates an example of interacting with media clips with multiple subcomponents.

In some embodiments, the GUI provides various visual cues for working with media clips with multiple subcomponents. FIG. 6 illustrates an example of interacting with media clips with multiple subcomponents in two stages 601 and 602. The example of this figure shows GUI 600 with a preview window 614, inspector 616, and timeline 620. In the first stage 601, clip 628 has been selected, as indicated by the dark black outline.

GUI 600 of some embodiments provides controls for applying effects to the various media clips associated with the media project. The effects of some embodiments include various video effects and audio effects. In some embodiments, the effects are applied at a role-subcomponent level. Whereas other applications apply effects at a clip level (e.g., an effect applied to a clip or to any subcomponent of the clip is mixed into the clip), the media application of some embodiments applies effects at a role-subcomponent level, allowing effects to be assigned to the individual subcomponents based on an assigned role. For example, a clip with dialogue and music subcomponents can apply effects to the different subcomponents with the different roles, maintaining the separation between the effects at the role-subcomponent level rather than mixing the effects and subcomponents up to the clip level.

In this example, the selected media clip is an audio clip 628 with multiple subcomponents 624 and 634. Inspector 616 displays various controls for providing information, modifying properties, and applying effects to the media clip 628 and its subcomponents 624 and 634. Related clips 624 and 634 are outlined with a lighter gray color to indicate that they are related to the selected clip 628. In some embodiments, related clips include a media clip with multiple subcomponents (e.g., different audio channels, different tracks, etc.), or different clips in a clip collection (e.g., a grouped set of clips).

In order to distinguish the related clips of a selected clip to a user, the GUI of some embodiments displays a webbing 635 in timeline 620. In this example, the webbing is displayed as a gray region surrounding all of the related clips in the timeline area. The webbing 635 provides a visual indication that allows a user to quickly determine when a particular clip has other related clips in the timeline.

In some embodiments, inspector 616 also includes slide bar 690 that can be moved to display other portions of the inspector. For example, in some embodiments, the inspector includes a portion for displaying details (e.g., related clips, assigned roles, etc.) regarding a selected clip. Moving the slide bar 690 to the top of the inspector area slides the hidden portion into view. Alternatively, or conjunctively, some embodiments allow a user to resize the different display areas (e.g., inspector 616, preview display area 614, timeline 620) to show more or less of each display area in the GUI 600.

The first stage 601 shows that the user selects the bottom edge of the inspector 616 and drags it downward. The second stage 602 shows that in response to the dragging of the bottom edge, inspector 616 is now shown in a full-height view, taking up the entire right side of GUI 600. Timeline 320 has been resized to fit the remaining area.

In addition, the expanded inspector 616 now shows additional information regarding the selected clip 628. In particular it shows representations 644, 642, and 646 for the selected clip 628 and the related clips 624 and 634 respectively. In some embodiments, the representations 644, 642, and 646 in the inspector 616 are displayed with a same color scheme (e.g., associated role colors, primary and secondary outline colors, etc.) as the media clips 624, 628, and 634 in the timeline 620. In some embodiments, the inspector 616 provides controls for modifying properties (e.g., roles, effects, etc.) for the selected clip 628 and related clips 624 and 634. For example, some embodiments provide context menus, similar to the role editor 370 described with reference to FIG. 3, for modifying the roles for the selected clip or the related clips.

Figure 7:
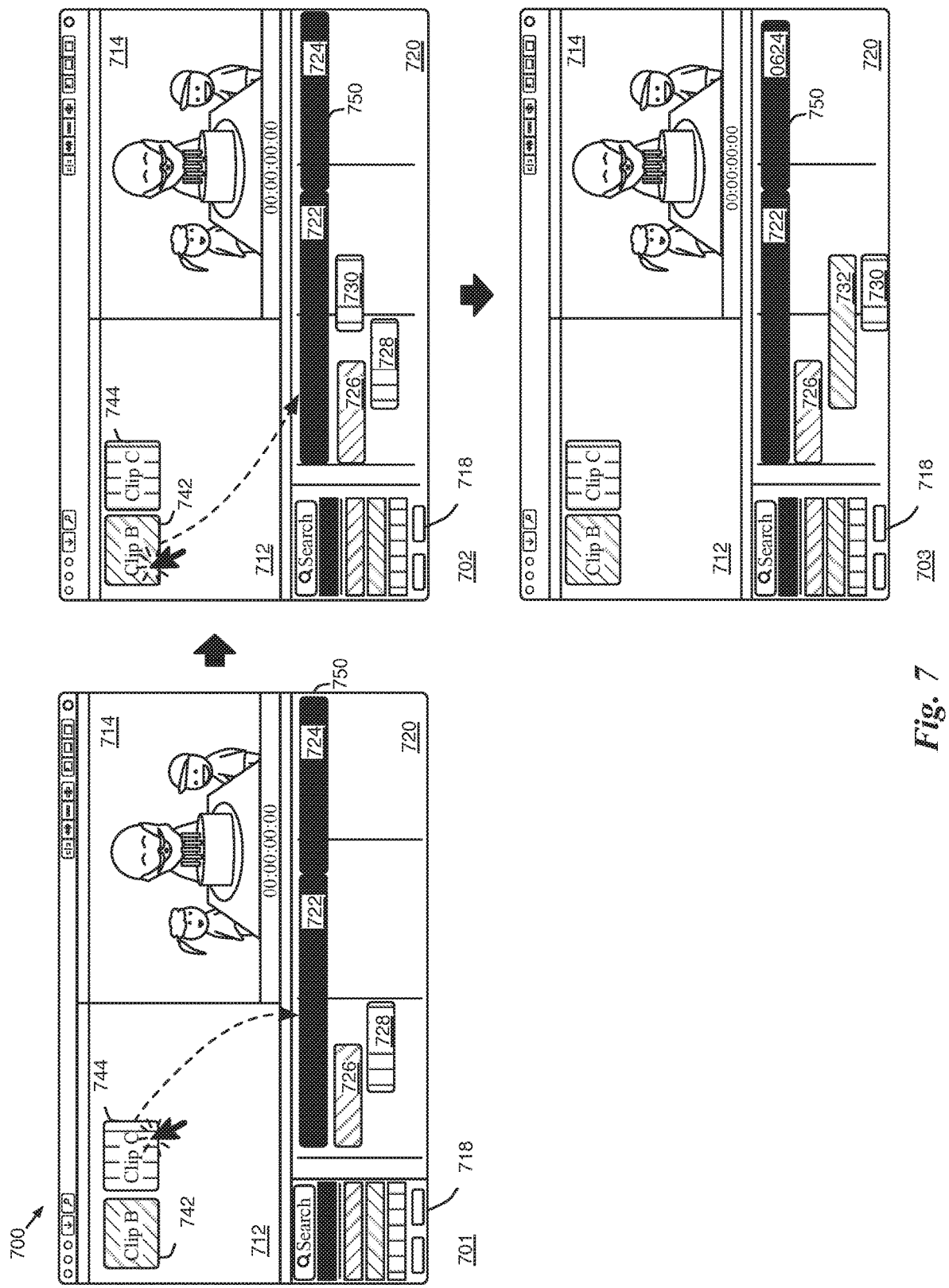
FIG. 7 illustrates an example of a magnetic, trackless timeline for organizing anchor clips of a composite presentation.

The GUI of some embodiments uses the color schemes and subcomponents to visually organize the representations of the media clips in the timeline based on roles assigned to the media clips. Alternatively, or conjunctively, the GUI of some embodiments provides a magnetic timeline for editing and displaying media clips based on the assigned roles in a compact way. FIG. 7 illustrates an example of a magnetic, trackless timeline for organizing anchor clips of a composite presentation in three stages 701-703. The first stage 701 shows a magnetic trackless timeline 720. In the first stage 701, timeline 720 includes anchor media clips 726 and 728 anchored to spine media clip 722 of the spine 750. The GUI 700 includes a browser 712, preview display area 714, timeline index 718, and timeline 720. The first stage 701 also shows a user adding a new anchor media clip 732 from the browser 712 to be anchored to the spine media clip 722.

In the second stage 702, a representation 730 of the new anchor media clip 732 has been added to the timeline 720. The "magnetic" nature of the timeline 720 positions each anchored media clip as near to the spine 750 as possible, without overlapping any other media clips. In this example, media clip 730 is horizontally aligned with media clip 726, even though they have been assigned to different roles. The second stage 702 also shows that the user has added another media clip 742 from the browser 712 to the magnetic timeline 720.

As described above, the order of the roles, as shown in the timeline index 718, determines the positioning of the media clips in the timeline 720. The third stage 703, shows that representation 732 for new anchor media clip 742 has been added to the timeline 720. Because media clip 732 horizontally overlaps with media clips 726 and 730, they are each displayed in different lanes of the timeline 720. In this case, since new anchor media clip 732 is tagged with a role (indicated with an ascending diagonal) that is higher priority than the role for media clip 730 (indicated with vertical lines) and lower than the role for media clip 726 (indicated with descending vertical lines), the anchor media clip 742 is repositioned below media clip 726, but above media clip 730. In some embodiments, the role order is modifiable in the timeline index 718 to allow a user to rearrange related media clips (e.g., clips with a same role). The timeline index is described in further detail below with reference to FIGS. 13 and 14.

Figure 8:
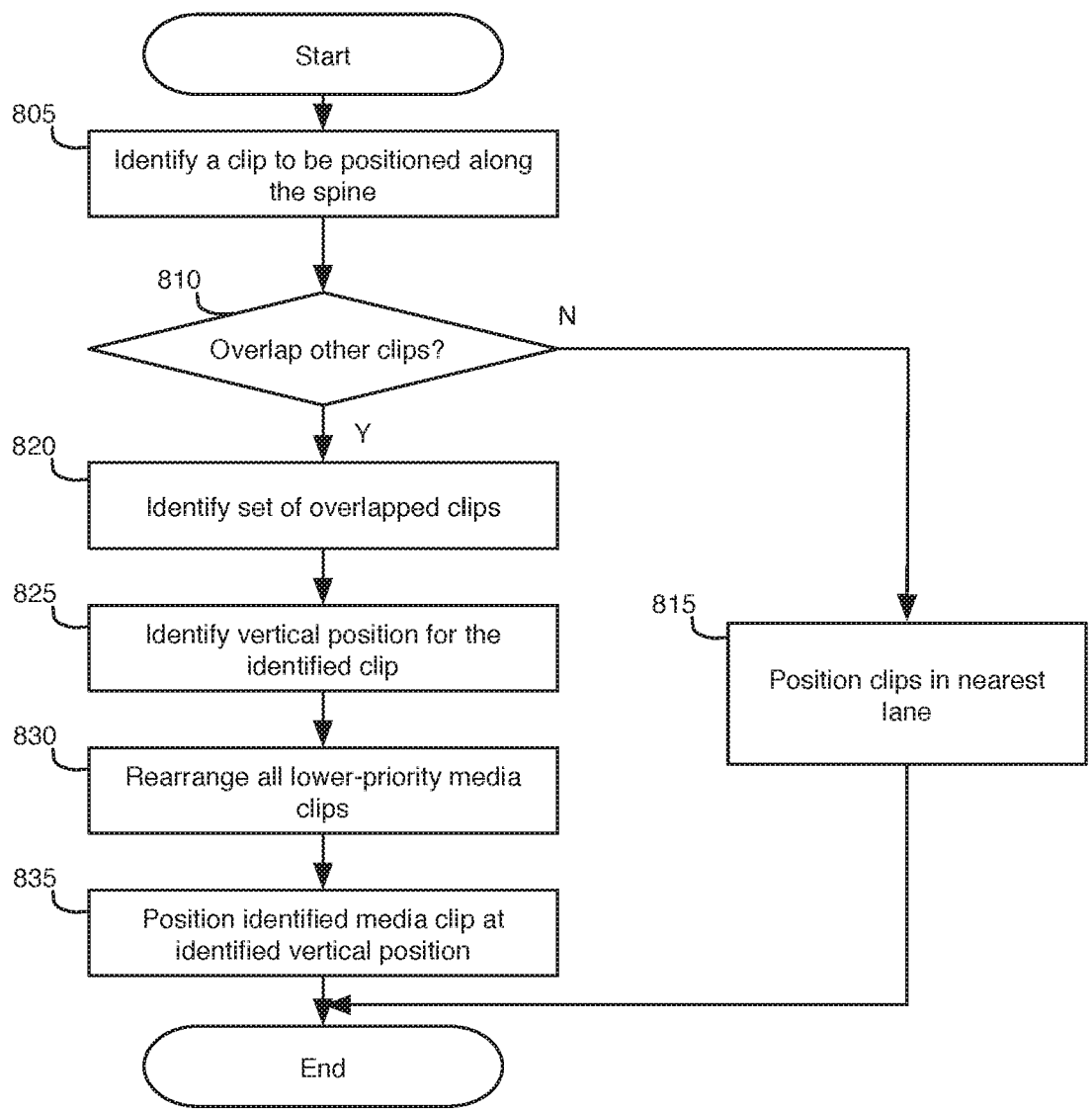
FIG. 8 conceptually illustrates a process for positioning media clips in an organized timeline.

The organized timeline positions media clips in the timeline based on the roles assigned to the media clips. FIG. 8 conceptually illustrates a process for positioning media clips in an organized timeline. The process 800 begins by identifying (at 805) a clip to be positioned at a particular position along a central compositing lane (or spine). The process 800 determines (at 810) whether the identified clip overlaps with any other media clips at the particular position. When the process 800 determines (at 810) that the identified clip does not overlap with any other media clips at the particular position, the process positions (at 815) the media clip in a nearest lane to the central compositing lane. In some embodiments, the timeline is displayed in a lane set view, in which the media clips are grouped into sets of lanes based on their assigned roles. In such embodiments, the nearest lane is the highest lane of the particular set of lanes for the role assigned to the identified clip.

When the process 800 determines (at 810) that the identified clip does overlap with other media clips at the particular position, the process 800 identifies (at 820) the set of clips that the identified clip overlaps at the particular position. The process 800 then identifies (at 825) a vertical position for the identified clip at the particular position based on a role order for the timeline and the roles assigned to the identified clip and to each clip of the set of overlapping clips. In some embodiments, the process 800 identifies (at 825) the vertical position by identifying the role for the identified clip and comparing it to the roles of the set of overlapped clips.

The process 800 then rearranges (at 830) all of the lower-priority media clips in the set of overlapping clips to lower lanes, creating new lanes as needed, and positions (at 835) the identified clip at the identified vertical position. In addition to arranging newly added clips, the magnetic timeline also repositions clips based on edits made to media clips in the timeline. The process 800 then ends.

Figure 9:
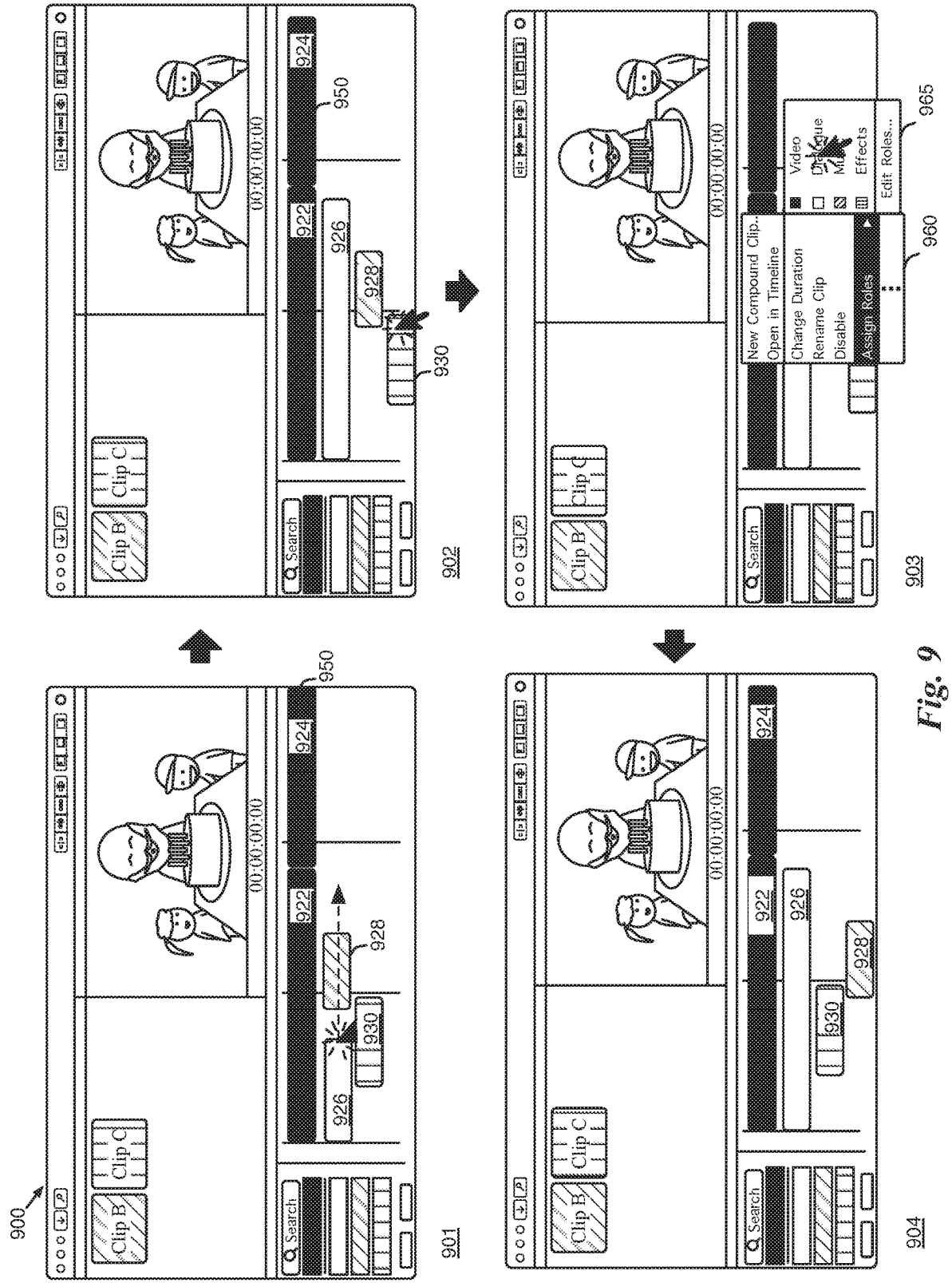
FIG. 9 illustrates an example of editing media clips within an organized, magnetic timeline.

FIG. 9 illustrates an example of editing media clips within an organized, magnetic timeline in four stages 901-904. In this example, GUI 900 shows media clips 922-930 in the timeline 920. In the first stage 901, the user selects a border of media clip 926 to extend the duration of the media clip in the timeline. In this example, the media clip 926 is extended past media clip 928, forcing media clip 928 to an anchor lane beneath media clip 926 and pushing media clip 930 to a new lane below media clips 942 and 926.

The second stage 902 shows that the user selects media clip 930 to assign a new role to the media clip. The third stage 903 shows that when the user selects (e.g., with a right-click) media clip 930, GUI 900 brings up a context menu 960. "Assign Roles" is selected in the context menu 960 to bring up menu 965. Menu 965 shows a list of roles that can be assigned to media clips in the composite presentation. The third stage 903 also shows that the user selects the music role to assign to media clip 930.

Finally, the fourth stage 904 shows that media clip 930 has been reassigned to the role and has been automatically repositioned within the timeline 920, above media clip 928, but below media clip 926 which overlaps with content from media clip 930 and shares the same role. In some embodiments, media clips with the same role are positioned relative to each other based on other criteria (e.g., when they were placed in the timeline, etc.).

The repositioning of clips in the timeline based on edits to the media clips allows a user to avoid having to manually create space for edited clips in existing tracks or having to add new tracks to the timeline. In some cases, edits to a clip can have effects on other related clips (e.g., subcomponents) that are not displayed.

Figure 10:
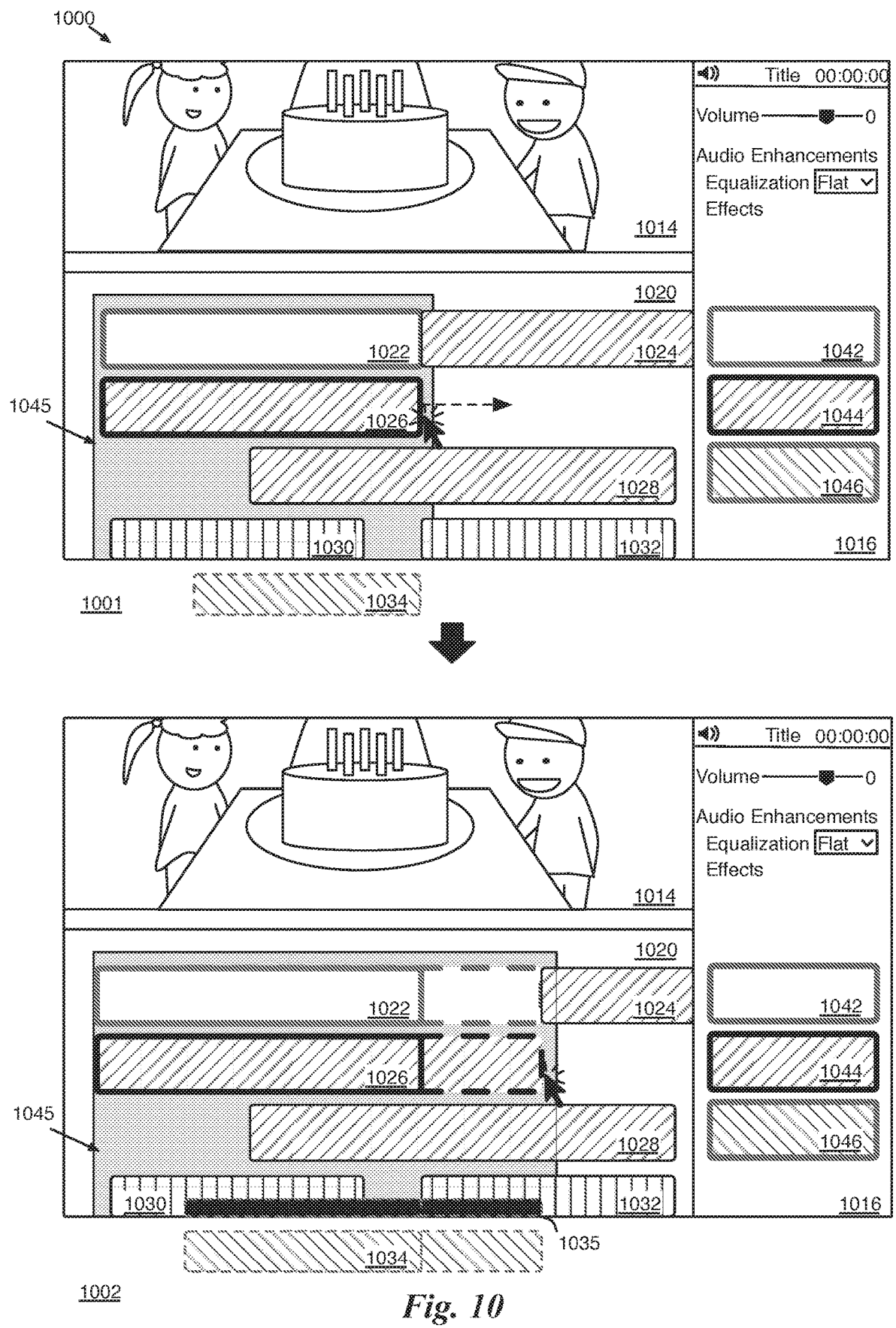
FIG. 10 illustrates an example of an off-screen indicator for modifying components of a media clip.

FIG. 10 illustrates an example of an off-screen indicator for modifying components of a media clip in two stages 1001 and 1002. The first stage 1001 shows GUI 1000 with webbing 1045, similar to GUI 600 described above with reference to FIG. 6. GUI 1000 shows a selected clip 1032 with related clips 1030 and 1034. In this example, one of the related clips, 1034, is not currently displayed within the timeline 1020 because of other media clips 1040 with higher priority roles. The webbing 1045 extends to the bottom of the screen to indicate that there is another subcomponent that is related to the selected clip.

The first stage 1001 shows that the right edges of all three of the clips 1030, 1032, and 1034 are aligned, but the left edges are not. Specifically, off-screen media clip 1034 begins at a later point in the timeline than the other media clips 1030 and 1032. In the first stage 1001, the user selects the right edge of the selected media clip 1032 and drags it toward the right to extend the length of the media clip 1032. As the right edges of the three media clips 1030-1034 are aligned, the edit affects all three related media clips.

The second stage 1002 shows that the user has dragged the edge of media clip 1032 toward the right. The effect of the drag action on the three media clips is shown with a dashed outline. In this example, in addition to the webbing 1060, GUI 1000 provides an off-screen indicator 1070 to show that the edit will affect other media clips that are not currently displayed. In this example, the off-screen clip is shown below the visible timeline area, so the off-screen indicator is shown at the bottom of the timeline. In other cases, when the off-screen clip is above the visible area (e.g., when the clip has been scrolled out of the visible area), the off-screen indicator 1070 is shown at the top of the timeline area 1020.

III. Tools for Working with an Organized Timeline

Figure 11:
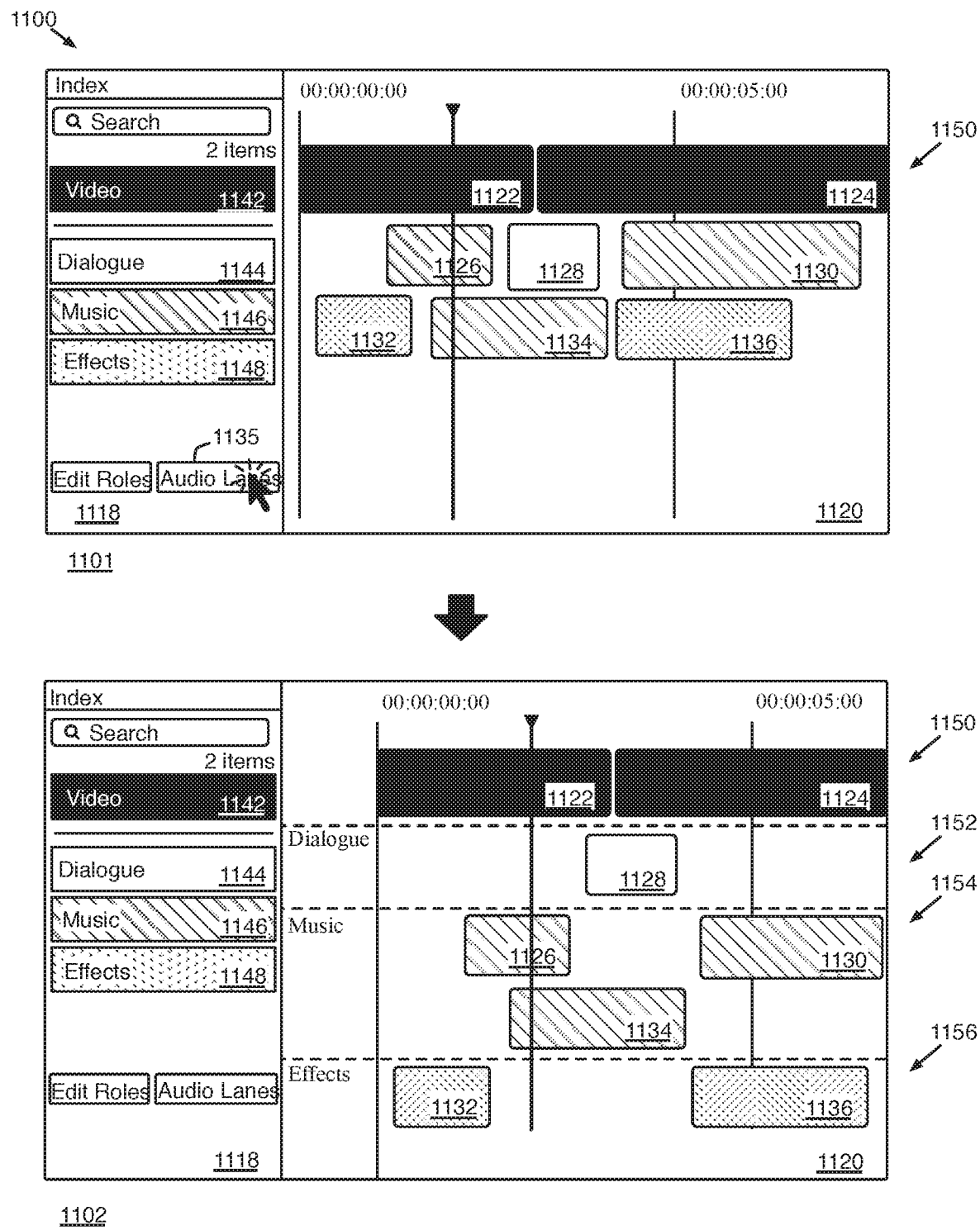
FIG. 11 illustrates an example of a UI control for displaying a lane set view for different tags.

The GUI of some embodiments provides various tools for organizing and displaying media clips in a magnetic timeline. FIG. 11 illustrates an example of a UI control for displaying a lane set view for different roles in two stages 1101-1102. The first stage 1101 shows a timeline index 1118 with roles 1142-1148 and a magnetic timeline 1120 with media clips 1122-1138, similar to other examples described above. The anchor clips 1126-1136 are vertically positioned so that (1) each clip is as near to the spine 1150 as possible without overlapping another clip and (2) every media clip with a higher priority is closer to the spine 1150 than any other clip that overlaps horizontally with the clip.

The first stage 1101 also shows an audio lanes control 1135. The audio lanes control 1135 of some embodiments is a toggle for switching between a standard view (e.g., the magnetic timeline view described above with reference to FIG. 7) and an audio lanes view, which repositions the media clips of the composite media presentation into lane sets based on the role for each media clip. Although this example is directed toward audio lanes, one skilled in the art would recognize that similar tools may be used for other types of media clips. The first stage 1101 shows that a user selects audio lanes control 1135 to toggle from the standard view to an audio lanes view (or lane set view).

In the second stage 1102, the timeline 1120 is shown in an audio lanes view. In this view, media clips are divided into anchor lane sets 1152-1156 to separate media clips of the different roles into sections (or sets of lanes), allowing a user to quickly distinguish the media clips of the different roles. Dashed lines are used to show the boundaries between the different lane sets. In some embodiments, the associated role for each lane set is also displayed to allow a user to quickly identify the role associated with a particular lane set.

In some embodiments, each lane set is magnetic, with clips with a particular role gravitating toward the spine 1150 without leaving the corresponding lane set. For example, media clip 1130 is positioned at the top of the lane set 1154, but does not enter the space of lane set 1152 because it has a different role. No clip is horizontally aligned with another media clip with a different role.

Figure 12:
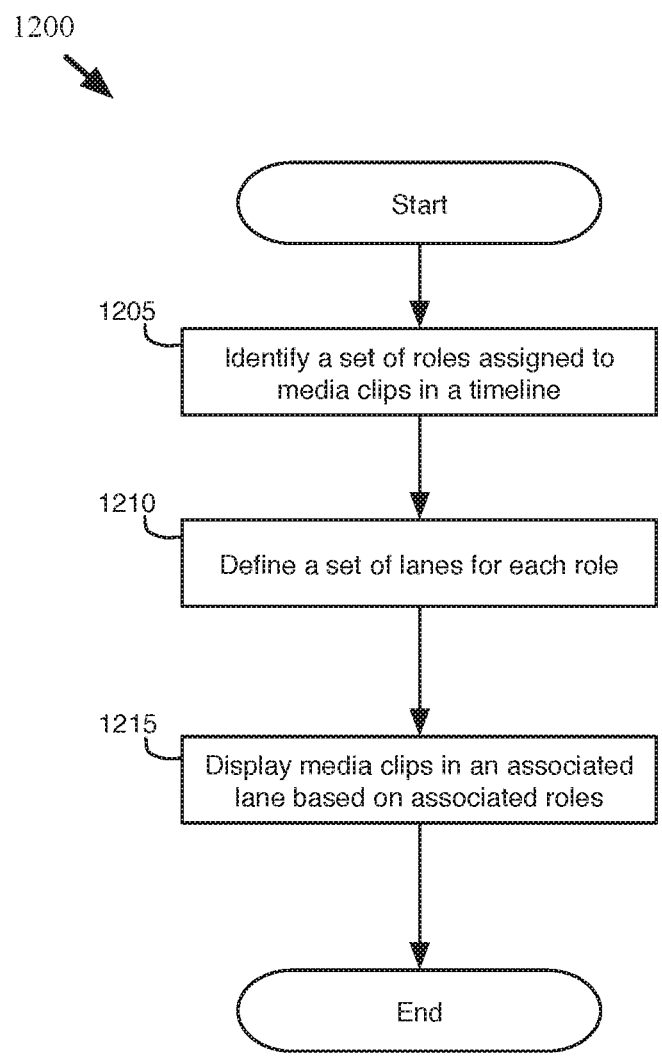
FIG. 12 conceptually illustrates another process for displaying media clips of a composite presentation based on associated roles.

FIG. 12 conceptually illustrates another process for displaying media clips of a composite presentation based on associated roles. The process 1200 identifies (at 1205) a set of roles assigned to media clips in a timeline of the composite presentation. The process 1200 defines (at 1210) a set of lanes (or a lane set) for each role of the set of roles. The lane sets of some embodiments are positioned based on a role order for the different roles, specified by the user. The process 1200 then displays (at 1215) media clips in an associated lane set based on a role associated with the media clip.

Figure 13:
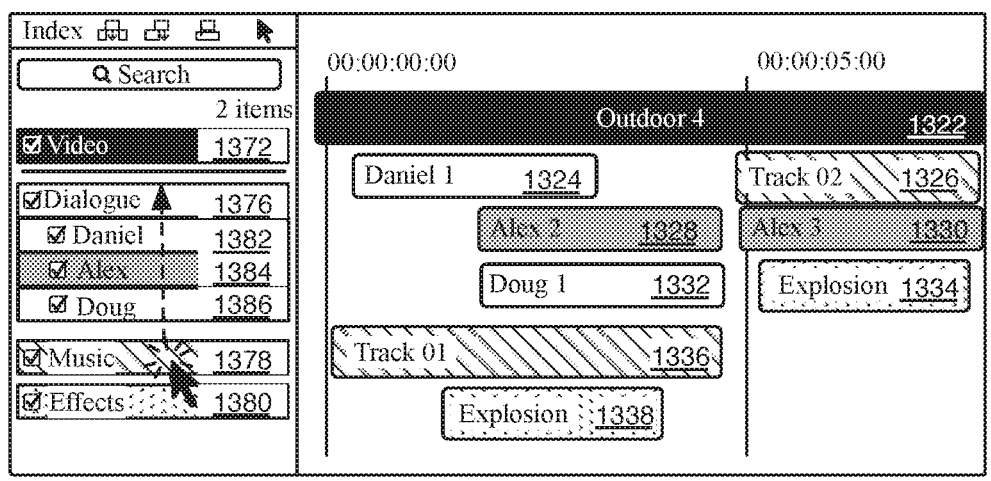
FIG. 13 illustrates an example of modifying a tag index order in a standard view.
Figure 13:
Figure 13:
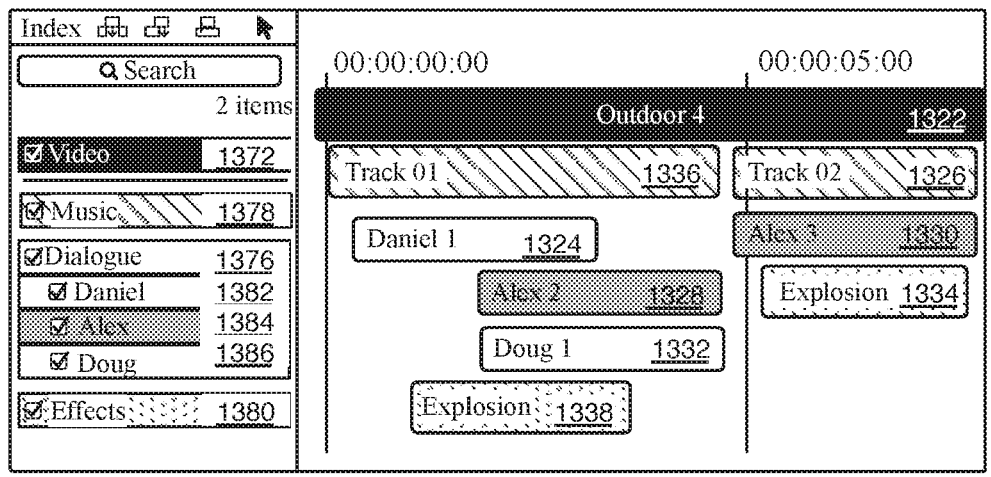
Figure 14:
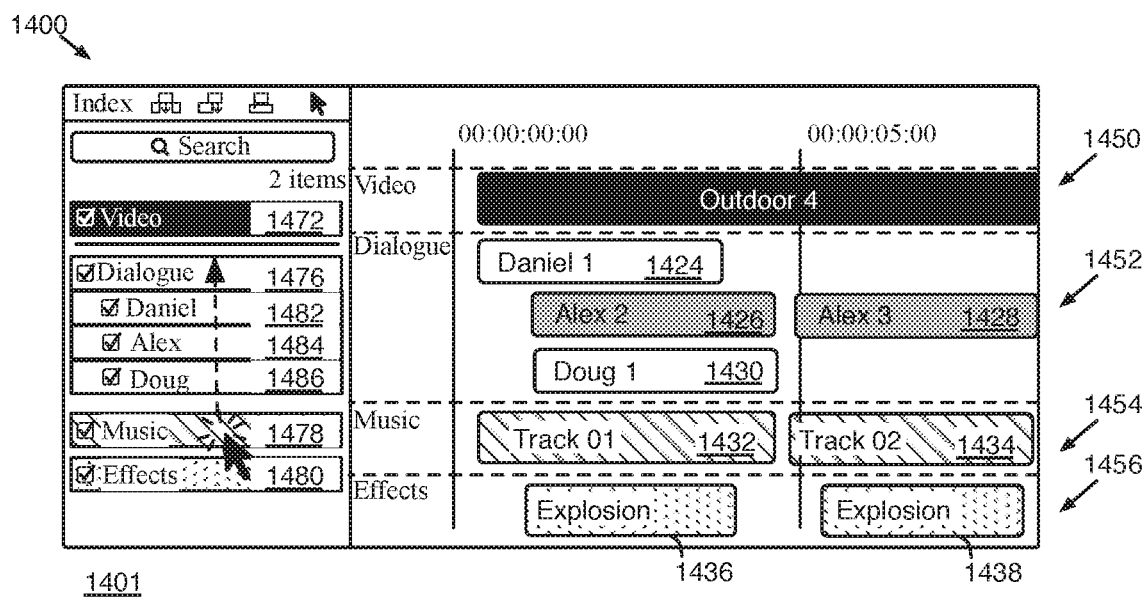
FIG. 14 illustrates an example of modifying a tag index order in a lane set view.
Figure 14:
Figure 14:
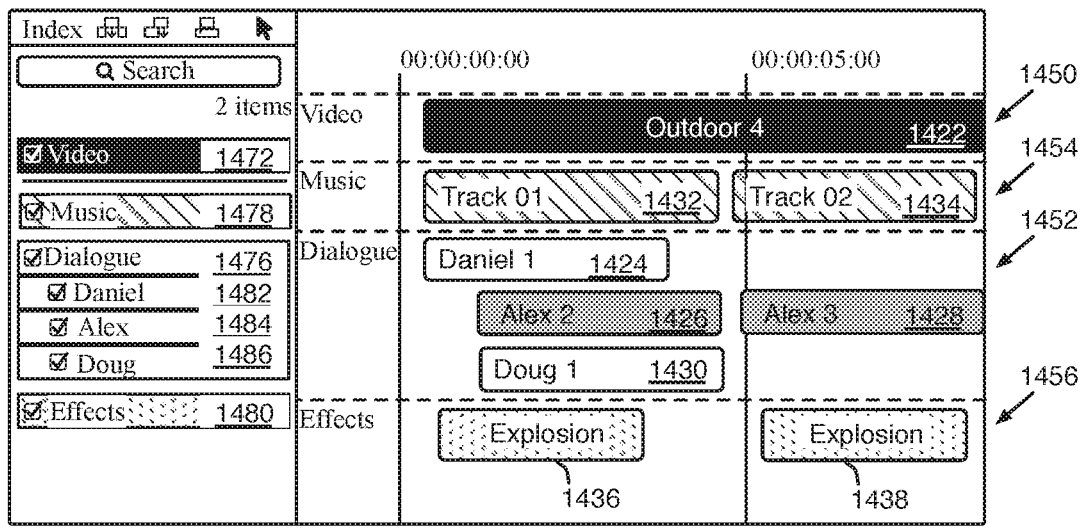

As described in the examples above, the organized timeline organizes the media clips of a composite presentation based on a role index order for the roles assigned to the media clips. In some embodiments, the GUI for the media editing application includes a modifiable timeline index to allow a user to re-order the media clips within the timeline, based on the associated roles. FIGS. 13 and 14 shows examples of modifying a role index order in a standard view and a lane set view respectively.

FIG. 13 illustrates an example of modifying a tag index order in a standard view in two stages 1301 and 1302. The first stage 1301 shows GUI 1300 with a timeline index 1318 and timeline 1320. Timeline index 1318 includes a listing of the roles for the project. The roles are displayed in the timeline index 1318 according to a role index order.

In this example, media clips 1324, 1328, and 1332 are assigned different sub-roles 1382, 1384, 1386 under a parent dialogue role 1376. To distinguish clips of the different sub-roles 1382, 1384, 1386, the media clips 1324, 1328, and 1332 are displayed in alternating shades of the color (indicated with a solid pattern) associated with the parent dialogue role 1376.

The first stage 1301 also shows that a user selects the music role 1378 in the timeline index 1318 and drags it above the dialogue role 1376. In response to the rearrangement of the roles in the timeline index 1318, the second stage 1302 shows that the media clips have been rearranged according to the new index order. In particular, media clips 1324, 1328, and 1332, associated with a dialogue role, have been moved below media clip 1334, which is associated with the music role 1378.

FIG. 14 illustrates an example of modifying a tag index order in a lane set view in two stages 1401 and 1402. The first stage 1401 shows GUI 1400 with a timeline index 1410 and timeline 1420. Timeline index 1418 includes a listing of the roles for the project. The roles are displayed in the timeline index 1418 according to a role index order. This example is similar to the example of FIG. 13, but rather than displaying the clips in a standard view, the clips are arranged in lane sets based on the associated roles.

In this example, media clips 1424, 1426, and 1430 are assigned different sub-roles 1482, 1484, 1486 under a parent dialogue role 1476. To distinguish clips of the different sub-roles 1482, 1484, 1486, the media clips 1424, 1426, and 1430 are displayed in alternating shades of the color (indicated with a solid pattern) associated with the parent dialogue role 1476. Media clips with the parent dialogue role and any of the sub-roles are positioned in the dialogue lane set 1452.

The first stage 1401 also shows that a user selects the music role 1478 in the timeline index 1418 and drags it above the dialogue role 1476. In response to the rearrangement of the roles in the timeline index 1418, the second stage 1402 shows that the anchor lane sets 1452-1456 have been rearranged according to the new index order. In particular, lane set 1454, associated with a music role, has been moved above lane set 1452, which is associated with the dialogue role 1476.

Figure 15:
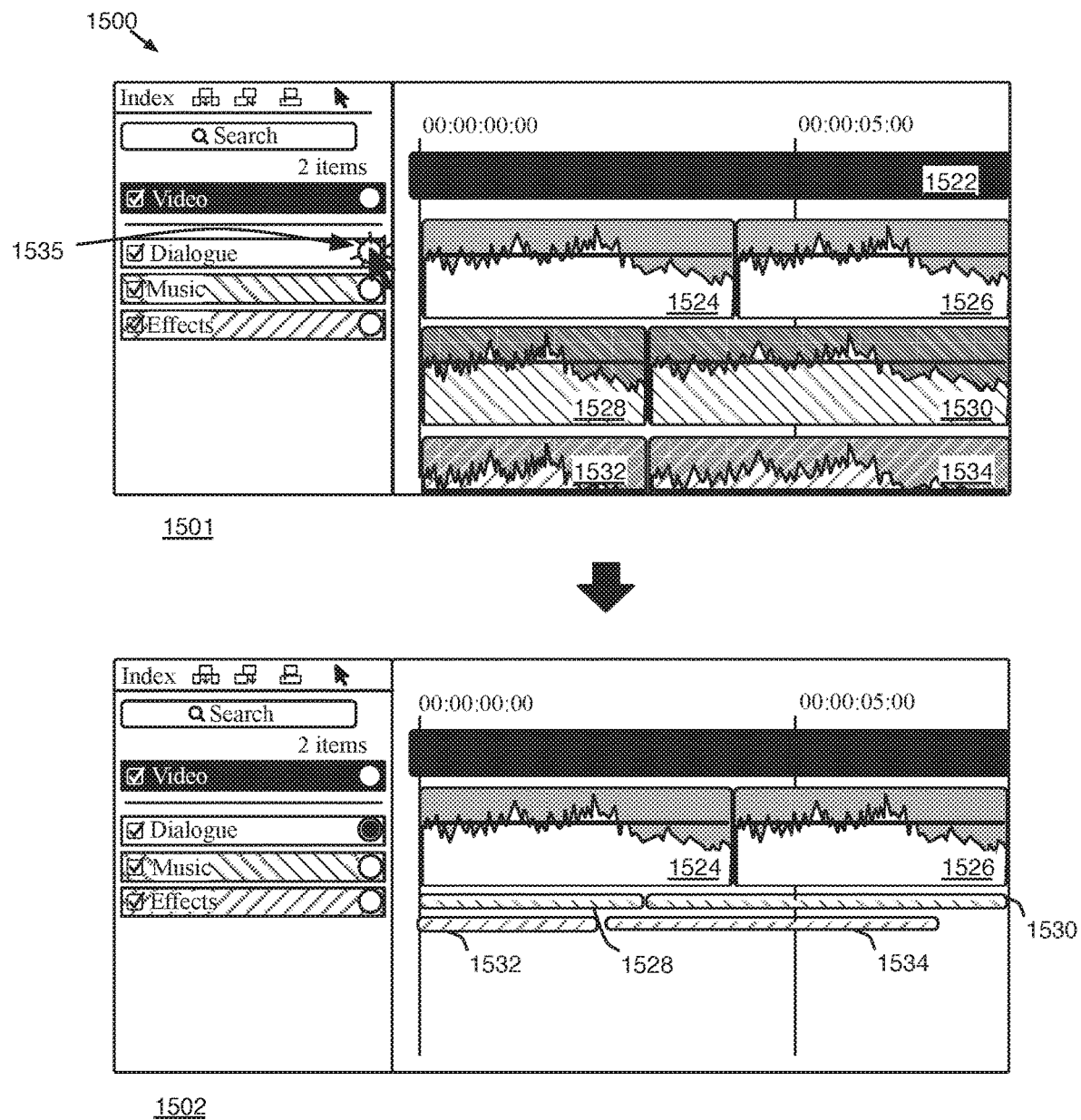
FIG. 15 illustrates an example of a focus tool for focusing on clips with a particular tag within the organized timeline.

FIG. 15 illustrates an example of a focus tool for focusing on clips with a particular tag within the organized timeline in two stages 1501-1502. The first stage 1501 shows timeline index 1518 and timeline 1520. The media clips 1522-1534 displayed in the timeline 1520 display content for the associated media clips. In some embodiments, different types of representations (e.g., audio waveforms, video thumbnails, associated text, etc.) for the content of a media clip are displayed. In addition, each media clip is colored based on the associated role. In this example, the media clip 1524 is shown in a two-tone color schema in a first color (i.e., solid pattern), media clip 1528 is shown in a two-tone color schema in a second color (i.e., descending diagonal pattern), and media clip 1532 is shown in a two-tone color schema in a third color (i.e., ascending diagonal pattern).

In the first stage 1501, the user selects a focus tool 1535 for the dialogue role 1576 to focus the GUI 1500 on media clips associated with the dialogue role 1576. The second stage 1502 shows that, in response to the selection of focus tool 1535, media clips 1528-1534, which are not associated with the dialogue role 1576, are now displayed as minimized elements 1528-1534.

The minimized elements 1528-1534 of some embodiments are displayed as solid lines (or some other geometric shape) in the color associated with a role for the media clip, hiding the content (e.g., waveforms, thumbnails, etc.) of the media clip, but providing some information regarding the clip (e.g., associated roles, length and duration of the clip in the presentation, etc.). In some embodiments, the solid line is displayed with a length that matches the length of the media clip in the timeline. The minimized elements allow a user to view the details for a portion of the media project (i.e., the media clips of the focused role) and context for where the focused portion fits within the media project, providing necessary details for the focused portion, while also providing a broader view of the overall media project. In addition to displaying other clips as single solid lines, the focus tool 1535 of some embodiments repositions the focused media clips to be near the spine in order to facilitate editing of the composite presentation.

The organized timeline, along with the tools for working with media clips and roles in the timeline, allow users of a media editing application to quickly and efficiently work with relevant media clips of a composite presentation based on assigned roles for the media clips.

V. Electronic System

Many of the above-described features and applications are implemented as software processes that are specified as a set of instructions recorded on a computer readable storage medium (also referred to as a computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
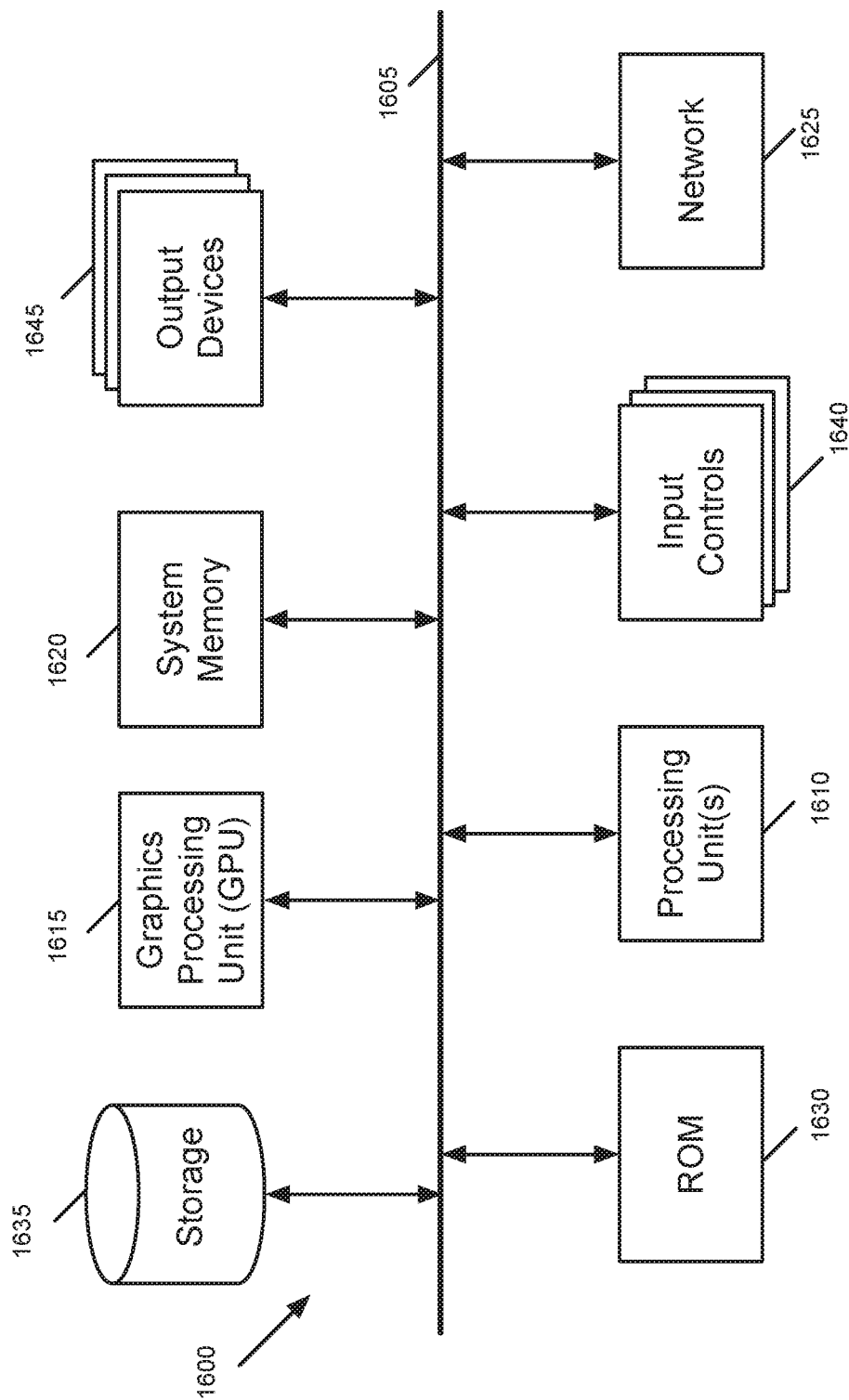
FIG. 16 conceptually illustrates an example of an electronic system with which some embodiments of the invention are implemented.

FIG. 16 conceptually illustrates an example of an electronic system 1600 with which some embodiments of the invention are implemented. The electronic system 1600 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1600 includes a bus 1605, processing unit(s) 1610, a graphics processing unit (GPU) 1615, a system memory 1620, a network 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the GPU 1615, the system memory 1620, and the permanent storage device 1635.

From these various memory units, the processing unit(s) 1610 retrieves instructions to execute and data to process in order to execute the processes of the invention. The processing unit(s) may be a single processor or a multi-core processor in different embodiments. Some instructions are passed to and executed by the GPU 1615. The GPU 1615 can offload various computations or complement the image processing provided by the processing unit(s) 1610. In some embodiments, such functionality can be provided using CoreImage's kernel shading language.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive, integrated flash memory) as the permanent storage device 1635.

Other embodiments use a removable storage device (such as a floppy disk, flash memory device, etc., and its corresponding drive) as the permanent storage device. Like the permanent storage device 1635, the system memory 1620 is a read-and-write memory device. However, unlike storage device 1635, the system memory 1620 is a volatile read-and-write memory, such a random access memory. The system memory 1620 stores some of the instructions and data that the processor needs at runtime. In some embodiments, the invention's processes are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet), or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 4, 8, and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a media editing application for execution by at least one processing unit, the media editing application comprising a graphical user interface (GUI) for display on a first monitor and a second monitor, the GUI comprising:
    a composite display area for displaying a plurality of media clips along a timeline for compositing into a composite media presentation on the first monitor;
    a second-monitor display area for selectively moving one or more elements of the GUI currently displayed on the first monitor to be displayed on the second monitor, without user input, in response to the media editing application detecting presence of the second monitor, the one or more elements being selected based on which elements of the GUI are currently displayed on the first monitor; and
    a menu listing available display areas selectable to cause movement of a selected display area to the second monitor, the available display areas comprising the timeline, a browser for viewing at least one library comprising a set of media clips that are candidates for inclusion in the composite media presentation, an inspector for displaying information about a selected clip, and a library listing showing available media libraries.

2. The non-transitory machine readable medium of claim 1, wherein a plurality of clips arranged along the timeline are associated with different tags, the composite display area comprising a spine spanning the timeline to arrange a first set of clips and to anchor a second set of clips to the first set of clips, and wherein the GUI further comprises:
    a GUI control that upon selection, defines a set of lanes for each tag and displays any anchored clip that is associated with a tag in the set of lanes associated with the tag; and
    an ordered list of tags, wherein vertical positioning of the sets of lanes for the tags depends on an order of the tags in the ordered list.

3. The non-transitory machine readable medium of claim 1, wherein the second-monitor display area is configured to move the composite display area from the first monitor to the second monitor and display one or more additional elements of the GUI on the first monitor.

4. The non-transitory machine readable medium of claim 1, wherein the second-monitor display area is configured to enlarge and display the browser on the second monitor responsive to selection from the menu.

5. The non-transitory machine readable medium of claim 1, wherein the second-monitor display area is configured to enlarge and display the inspector on the second monitor responsive to selection from the menu.

6. The non-transitory machine readable medium of claim 1, wherein the GUI further comprises a display area user interface (UI) icon selectable to cause the GUI to change the one or more elements of the GUI displayed on the second monitor.

7. The non-transitory machine readable medium of claim 6, wherein the menu is displayed in response to selection of the display area UI icon.

8. A method, comprising:
    providing a media editing application comprising a graphical user interface (GUI) for display on a first monitor and a second monitor, the GUI comprising:
        a composite display area for displaying a plurality of media clips along a timeline for compositing into a composite media presentation on the first monitor;
        a second-monitor display area for selectively moving one or more elements of the GUI currently displayed on the first monitor to be displayed on the second monitor, without user input, in response to the media editing application detecting presence of the second monitor, the one or more elements being selected based on which elements of the GUI are currently displayed on the first monitor; and
        a menu listing available display areas selectable to cause movement of a selected display area to the second monitor, the available display areas comprising the timeline, a browser for viewing at least one library comprising a set of media clips that are candidates for inclusion in the composite media presentation, an inspector for displaying information about a selected clip, and a library listing showing available media libraries.

9. The method of claim 8, wherein the second-monitor display area is configured to display the composite display area extended to the second monitor.

10. The method of claim 8, wherein the second-monitor display area is configured to move the composite display area from the first monitor to the second monitor and display one or more additional elements of the GUI on the first monitor.

11. The method of claim 8, wherein the second-monitor display area is configured to enlarge and display the browser on the second monitor responsive to selection from the menu.

12. The method of claim 8, wherein the second-monitor display area is configured to enlarge and display the inspector on the second monitor responsive to selection from the menu.

13. The method of claim 8, wherein the GUI further comprises a display area user interface (UI) icon selectable to cause the GUI to change the one or more elements of the GUI displayed on the second monitor.

14. The method of claim 13, wherein the menu is displayed in response to selection of the display area UI icon.

15. A system, comprising:
   a first monitor;
   a second monitor;
   at least one processing unit; and
   a non-transitory machine readable medium storing a media editing application for execution by the at least one processing unit, the media editing application comprising a graphical user interface (GUI) for display on the first monitor and the second monitor, the GUI comprising:
   a composite display area for displaying a plurality of media clips along a timeline for compositing into a composite media presentation on the first monitor;
   a second-monitor display area for selectively moving one or more elements of the GUI currently displayed on the first monitor to be displayed on the second monitor, without user input, in response to the media editing application detecting presence of the second monitor, the one or more elements being selected based on which elements of the GUI are currently displayed on the first monitor; and
   a menu listing available display areas selectable to cause movement of a selected display area to the second monitor, the available display areas comprising the timeline, a browser for viewing at least one library comprising a set of media clips that are candidates for inclusion in the composite media presentation, an inspector for displaying information about a selected clip, and a library listing showing available media libraries.

16. The system of claim 15, wherein the second-monitor display area is configured to move the composite display area from the first monitor to the second monitor and display one or more additional elements of the GUI on the first monitor.

17. The system of claim 15, wherein the second-monitor display area is configured to enlarge and display the browser on the second monitor responsive to selection from the menu.

18. The system of claim 15, wherein the second-monitor display area is configured to enlarge and display the inspector on the second monitor responsive to selection from the menu.

19. The system of claim 15, wherein the GUI further comprises a display area user interface (UI) icon selectable to cause the GUI to change the one or more elements of the GUI displayed on the second monitor.

20. The system of claim 19, wherein the menu is displayed in response to selection of the display area UI icon.

\* \* \* \* \*